US012748257B2

(12) United States Patent
Li et al.

(10) Patent No.: US 12,748,257 B2
(45) Date of Patent: Sep. 29, 2026

(54) FIBER OPTIC SENSING APPARATUS AND SYSTEM

(71) Applicant: JINAN UNIVERSITY, Guangzhou (CN)

(72) Inventors: Kaiwei Li, Guangzhou (CN); Tuan Guo, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 396 days.

(21) Appl. No.: 17/828,155

(22) Filed: May 31, 2022

(65) Prior Publication Data

US 2022/0381984 A1 Dec. 1, 2022

(30) Foreign Application Priority Data

May 31, 2021 (CN) ......................... 202110601242.6
Dec. 8, 2021 (CN) ......................... 202123060280.X

(51) Int. Cl.
*G02B 6/12* (2006.01)
*G01N 21/552* (2014.01)
(Continued)

(52) U.S. Cl.
CPC ......... *G02B 6/1226* (2013.01); *G01N 21/553* (2013.01); *G01N 21/59* (2013.01); *G01N 2021/5903* (2013.01)

(58) Field of Classification Search
CPC .... G02B 6/1226; G01N 21/553; G01N 21/59; G01N 2021/5903
See application file for complete search history.

(56) References Cited

U.S. PATENT DOCUMENTS 5,494,798 A * 2/1996 Gerdt .................. C12Q 1/6825 435/6.12
5,923,031 A * 7/1999 Naya .................... G01N 21/553 356/244
(Continued)

FOREIGN PATENT DOCUMENTS

CN 103604777 A * 2/2014
CN 105158213 A * 12/2015
(Continued)

OTHER PUBLICATIONS

Guo, T.; González-Vila, Á.; Loyez, M.; Caucheteur, C. Plasmonic Optical Fiber-Grating Immunosensing: A Review. Sensors 2017, 17, 2732. https://doi.org/10.3390/s17122732 (Year: 2017).*
(Continued)

*Primary Examiner* — Peter Radkowski
(74) *Attorney, Agent, or Firm* — PATTAO LLC; Junjie Feng

(57) ABSTRACT

A fiber-optic sensing apparatus is provided, including an outer sleeve, an optical fiber sensor arranged within the outer sleeve, and a filling medium. The optical fiber sensor is capable of detecting a change of a refractive index or a change of surface plasmon waves over an outer surface of the outer sleeve. The filling medium may have a matching refractive index with the outer sleeve and with the optical fiber sensor. The outer sleeve may be exposed directly to the outside medium, or may be coated with at least one functional film layer such as a surface plasmon resonance (SPR)-active base film layer, or a reactive film layer that is reactive to a target molecule in the outside medium.

19 Claims, 16 Drawing Sheets

(51) Int. Cl.
*G01N 21/59* (2006.01)
*G02B 6/122* (2006.01)

(56) References Cited

U.S. PATENT DOCUMENTS

| | | | | |
|---|---|---|---|---|
| 7,336,862 | B1 * | 2/2008 | Xai | G01D 5/35316 385/12 |
| 7,433,552 | B2 * | 10/2008 | Kiesel | G01J 3/0218 356/519 |
| 7,671,325 | B2 * | 3/2010 | Sanders | G01N 21/39 250/227.18 |
| 7,671,996 | B2 * | 3/2010 | Niwa | G01N 21/7703 356/445 |
| 7,792,392 | B2 * | 9/2010 | Chen | G01F 23/292 385/12 |
| 8,004,685 | B2 * | 8/2011 | Yamamichi | G01N 21/554 356/445 |
| 8,035,810 | B2 * | 10/2011 | Tazuke | G01N 33/54373 356/244 |
| 8,129,115 | B2 * | 3/2012 | Joko | C07H 21/00 435/6.1 |
| 8,277,750 | B2 * | 10/2012 | Hontsu | G01N 21/553 422/50 |
| 8,554,024 | B2 * | 10/2013 | Albert | G01N 33/54373 385/12 |
| 8,638,442 | B2 * | 1/2014 | Yamamichi | G01N 33/54373 356/445 |
| 9,012,207 | B2 * | 4/2015 | Blair | B82Y 15/00 422/82.11 |
| 9,138,948 | B2 * | 9/2015 | Swinehart | G02B 6/02 |
| 9,157,605 | B2 * | 10/2015 | Rodriguez | H01L 33/50 |
| 9,248,615 | B2 * | 2/2016 | Swinehart | B29D 11/00663 |
| 9,416,927 | B2 * | 8/2016 | Rodriguez | F21K 9/62 |
| 9,523,813 | B2 * | 12/2016 | Han | G02B 6/0229 |
| 9,797,842 | B2 * | 10/2017 | Tokonami | G01N 21/658 |
| 9,823,737 | B2 * | 11/2017 | Mazed | H04W 4/02 |
| 9,857,290 | B2 * | 1/2018 | Albert | G01B 11/18 |
| 9,871,948 | B2 * | 1/2018 | Papadopoulos | G03H 1/2286 |
| 9,880,142 | B2 * | 1/2018 | Potyrailo | G01N 21/783 |
| 9,982,850 | B2 * | 5/2018 | Rodriguez | F21V 9/38 |
| 10,048,200 | B2 * | 8/2018 | Abdulhalim | G01N 21/554 |
| 10,190,970 | B2 * | 1/2019 | Albert | G01N 21/553 |
| 10,529,003 | B2 * | 1/2020 | Mazed | G01N 33/551 |
| 10,788,621 | B2 * | 9/2020 | Li | C03C 25/1065 |
| 11,448,596 | B2 * | 9/2022 | Giorgini | G01N 21/4133 |
| 2007/0148760 | A1 * | 6/2007 | Klesel | G01J 3/0262 356/519 |
| 2008/0129980 | A1 * | 6/2008 | Dhawan | G01C 3/00 356/12 |
| 2008/0203281 | A1 * | 8/2008 | Sanders | G01N 21/39 250/227.18 |
| 2009/0066962 | A1 * | 3/2009 | Niwa | G01N 21/553 356/445 |
| 2009/0129721 | A1 * | 5/2009 | Chen | G01N 21/7703 385/12 |
| 2009/0153866 | A1 * | 6/2009 | Yamamichi | B01L 3/5088 356/445 |
| 2009/0195783 | A1 * | 8/2009 | Tazuke | G01N 21/7703 356/445 |
| 2009/0263072 | A1 * | 10/2009 | Albert | G01N 21/21 385/12 |
| 2009/0275721 | A1 * | 11/2009 | Cooper | C08B 37/0021 427/2.13 |
| 2009/0303489 | A1 * | 12/2009 | Allsop | G01N 21/7743 250/493.1 |
| 2010/0015670 | A1 * | 1/2010 | Joko | C12P 19/34 435/91.5 |
| 2010/0061678 | A1 * | 3/2010 | Swinehart | G01K 11/3206 264/1.27 |
| 2010/0256016 | A1 * | 10/2010 | Blair | G02B 5/008 506/13 |
| 2011/0014724 | A1 * | 1/2011 | Sim | G01N 33/54373 427/337 |
| 2011/0058768 | A1 * | 3/2011 | Swinehart | B29D 11/00663 385/32 |
| 2011/0212842 | A1 * | 9/2011 | Ibii | C12N 15/1048 506/1 |
| 2011/0263458 | A1 * | 10/2011 | Yamamichi | B01L 3/5088 506/40 |
| 2012/0194804 | A1 * | 8/2012 | He | G01N 21/45 356/128 |
| 2012/0289411 | A1 * | 11/2012 | Hatakeyama | C12N 15/1048 506/9 |
| 2013/0252275 | A1 * | 9/2013 | Tokonami | G01N 33/54346 436/171 |
| 2013/0286633 | A1 * | 10/2013 | Rodriguez | H01L 33/50 362/84 |
| 2013/0287355 | A1 * | 10/2013 | Han | G02B 6/1226 977/932 |
| 2014/0002821 | A1 * | 1/2014 | Albert | G01N 21/21 356/364 |
| 2015/0015879 | A1 * | 1/2015 | Papadopoulos | G02F 1/011 356/301 |
| 2016/0004298 | A1 * | 1/2016 | Mazed | G06F 3/011 345/633 |
| 2016/0010813 | A1 * | 1/2016 | Rodriguez | H01L 33/58 362/84 |
| 2016/0018331 | A1 * | 1/2016 | Blair | B82Y 20/00 506/9 |
| 2016/0178516 | A1 * | 6/2016 | Abdulhalim | G01N 29/022 977/954 |
| 2016/0334327 | A1 * | 11/2016 | Potyrailo | G02B 6/00 |
| 2016/0334866 | A9 * | 11/2016 | Mazed | G09G 3/001 |
| 2016/0355869 | A1 * | 12/2016 | Blair | G01N 21/7746 |
| 2016/0363274 | A1 * | 12/2016 | Rodriguez | C09K 11/883 |
| 2017/0010411 | A1 * | 1/2017 | Li | C03C 25/1065 |
| 2017/0288098 | A1 * | 10/2017 | Rodriguez | C09K 11/676 |
| 2017/0316487 | A1 * | 11/2017 | Mazed | G06Q 30/0241 |
| 2018/0088028 | A1 * | 3/2018 | Albert | G01N 33/54373 |
| 2019/0178804 | A1 * | 6/2019 | Jean-Ruel | G02B 6/4215 |
| 2019/0317130 | A1 * | 10/2019 | Sun | G01D 5/35345 |
| 2020/0371025 | A1 * | 11/2020 | Giorgini | G01N 21/553 |

FOREIGN PATENT DOCUMENTS

| | | | | | |
|---|---|---|---|---|---|
| CN | 103604777 | B | * | 1/2016 | |
| CN | 105784811 | A | * | 7/2016 | G01D 21/02 |
| CN | 106526195 | A | * | 3/2017 | G01N 33/68 |
| CN | 106896083 | A | * | 6/2017 | G01N 21/4133 |
| CN | 105784811 | B | * | 7/2018 | G01D 21/02 |
| CN | 105158213 | B | * | 8/2018 | |
| CN | 108572141 | A | * | 9/2018 | G01N 21/01 |
| CN | 108593735 | A | * | 9/2018 | G01D 5/35316 |
| CN | 108878162 | A | * | 11/2018 | H01G 11/26 |
| CN | 110133066 | A | * | 8/2019 | G01N 21/25 |
| CN | 110133320 | A | * | 8/2019 | G01K 11/32 |
| CN | 106896083 | B | * | 9/2019 | G01N 21/4133 |

OTHER PUBLICATIONS

Xiaoyong Chen, Jiajian Ruan, Tuan Guo, "Tilted fiber grating with metal nanocoating for calmodulin detection," Proc. SPIE 11566, AOPC 2020: Optical Spectroscopy and Imaging; and Biomedical Optics, 1156610 (Nov. 5, 2020); https://doi.org/10.1117/12.2579497 (Year: 2020).*

Yuke Liu, Binghao Liang, Xuejun Zhang, Nan Hu, Kaiwei Li, Francesco Chiavaioli, Xuchun Gui, and Tuan Guo, "Plasmonic Fiber-Optic Photothermal Anemometers With Carbon Nanotube Coatings," J. Lightwave Technol. 37, 3373-3380 (2019) (Year: 2019).*

Fu Liu, Xuejun Zhang, Tuan Guo, Jacques Albert; Optical detection of the percolation threshold of nanoscale silver coatings with optical fiber gratings. APL Photonics Jul. 1, 2020; 5 (7): 076101. https://doi.org/10.1063/5.0011755 (Year: 2020).*

Xuejun Zhang, Jie Chen, Álvaro Gonzalez-Vila, Fu Liu, Yuke Liu, Kaiwei Li, and Tuan Guo, "Twist sensor based on surface plasmon resonance excitation using two spectral combs in one tilted fiber Bragg grating," J. Opt. Soc. Am. B 36, 1176-1182 (2019) (Year: 2019).*

(56) References Cited

OTHER PUBLICATIONS

Xuejun Zhang, Jie Chen, Álvaro González-Vila, Fu Liu, Yuke Liu, Kaiwei Li, and Tuan Guo, "Twist sensor based on surface plasmon resonance excitation using two spectral combs in one tilted fiber Bragg grating: publisher's note," J. Opt. Soc. Am. B 36, 1435-1435 (2019) (Year: 2019).*

Y. Si et al., "Electrochemical Plasmonic Fiber-optic Sensors for Ultra-Sensitive Heavy Metal Detection," in Journal of Lightwave Technology, vol. 37, No. 14, pp. 3495-3502, 15 Jul. 15, 2019, doi: 10.1109/JLT.2019.2917329. (Year: 2019).*

Shunshuo Cai, Álvaro González-Vila, Xuejun Zhang, Tuan Guo, and Christophe Caucheteur, "Palladium-coated plasmonic optical fiber gratings for hydrogen detection," Opt. Lett. 44, 4483-4486 (2019) (Year: 2019).*

T. Ayupova et al., "Fiber Optic Refractive Index Distributed Multi-Sensors by Scattering-Level Multiplexing With MgO Nanoparticle-Doped Fibers," in IEEE Sensors Journal, vol. 20, No. 5, pp. 2504-2510, 1 Mar. 1, 2020, doi: 10.1109/JSEN.2019.2953231. (Year: 2020).*

G. Wang et al., "High-Speed and High-Resolution Microwave Photonic Interrogation of a Fiber-Optic Refractometer With Plasmonic Spectral Comb," in Journal of Lightwave Technology, vol. 38, No. 7, pp. 2073-2080, 1 Apr. 1, 2020, doi: 10.1109/JLT.2019.2959665 (Year: 2020).*

Seongmin Ju, Seongmook Jeong, Youngwoong Kim, Sang-Hyun Lee, Kadathala Linganna, Cheol Jin Kim, and Won-Taek Han, "Effect of heat treatment of optical fiber incorporated with Au nano-particles on surface plasmon resonance," Opt. Mater. Express 5, 1440-1449 (2015) (Year: 2015).*

Dhara et al., Transmission and reflection SPR disposable fibre probes for bio-chemical sensing, 2015 International Conference on BioPhotonics (BioPhotonics), Florence, Italy, 2015, pp. 1-5, doi: 10.1109/BioPhotonics.2015.7304041. (Year: 2015).*

Newman et al., Optical organophosphate/phosphonate sensor based upon gold nanoparticle functionalized quartz, Analytica Chimica Ccta 602 (2007) 101-107 (Year: 2007).*

Schunemann et al., Mesoporous Silica Supported Au and AuCu Nanoparticles for Surface Plasmon Driven Glycerol Oxidation, 2015, DOI: 10.1021/acs.chemmater.5b03520 (Year: 2015).*

Shen et al, Au-coated tilted fiber Bragg grating twist sensor based on surface plasmon Resonance, Applied Physics Letters 104, 071106 (2014) (Year: 2014).*

Tabassum et al., Cascaded wavelength multiplexed refractive index sensors in optical fibers based on surface plasmon resonances, J. Appl. Phys. 128, 073101 (2020); doi: 10.1063/5.0017256 (Year: 2020).*

* cited by examiner

FIG. 20
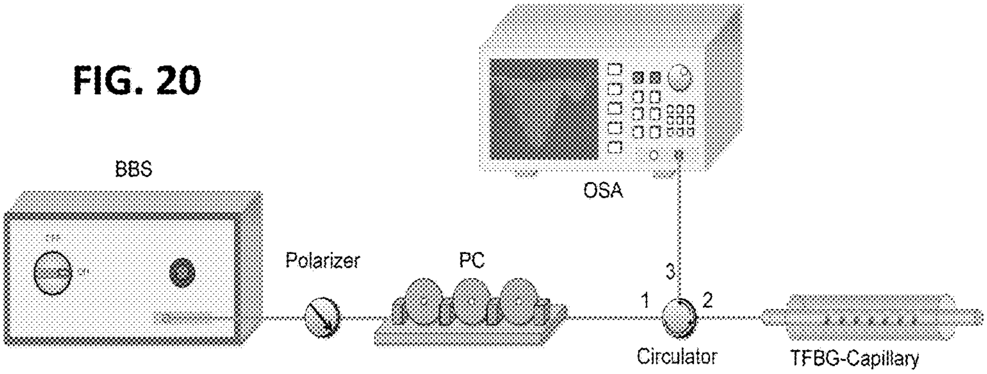
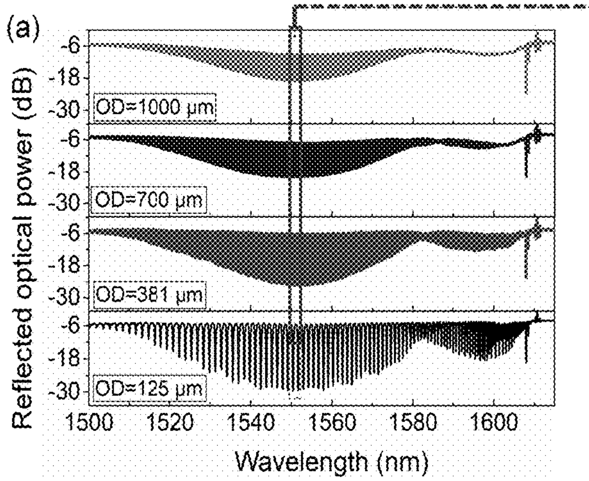
FIG. 21A
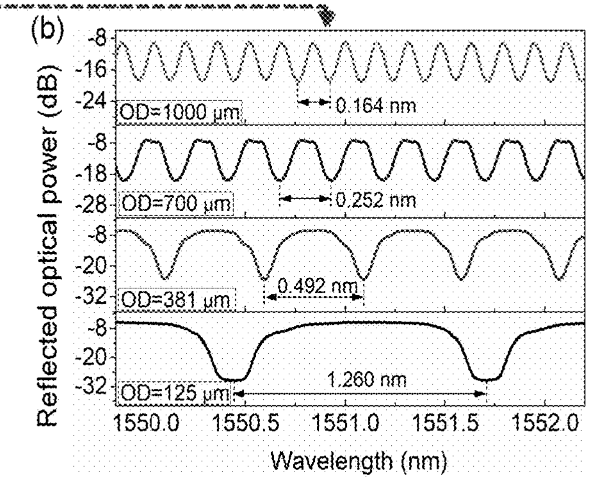
FIG. 21B
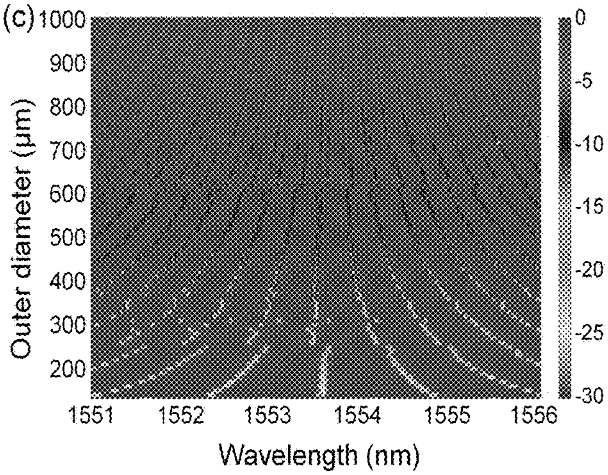
FIG. 21C
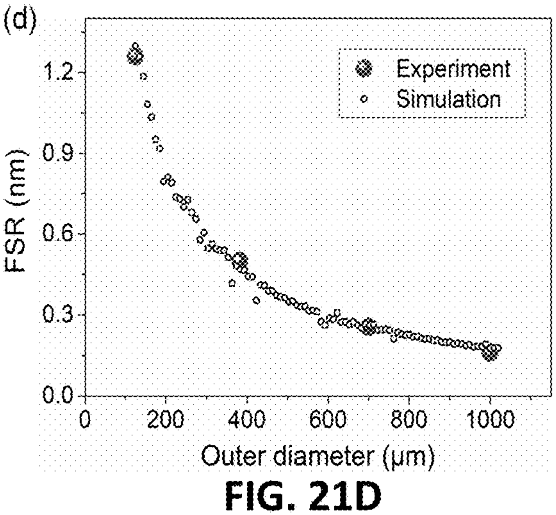
FIG. 21D

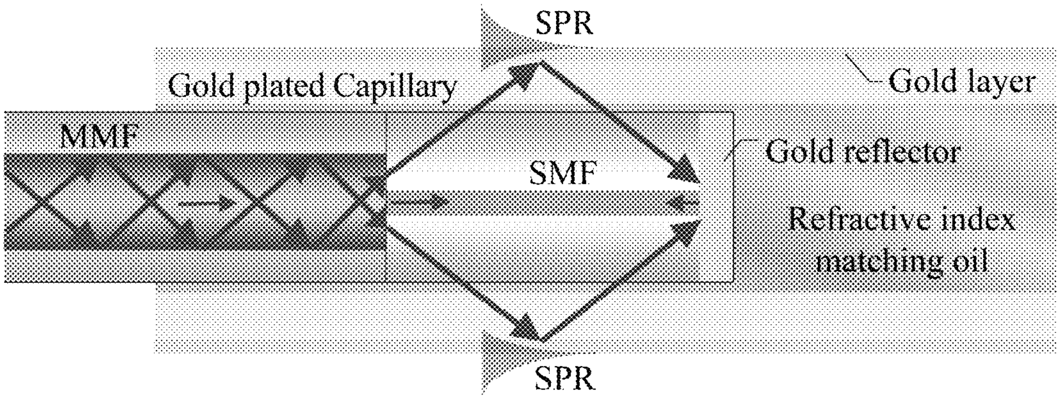
FIG. 24
FIG. 25A
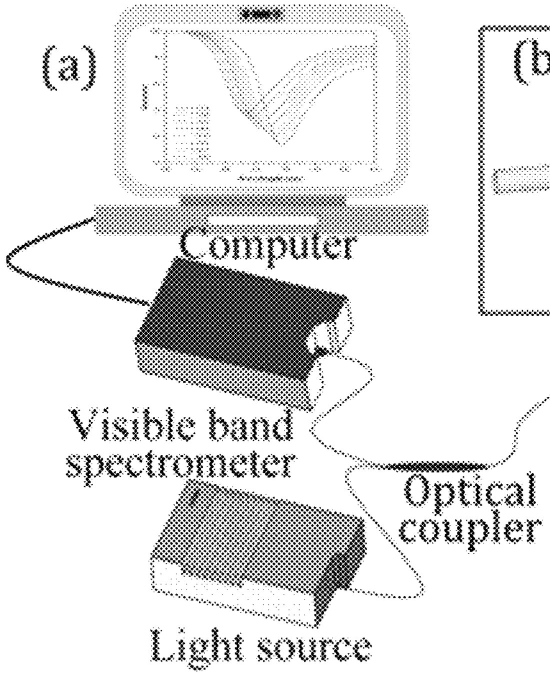
FIG. 25B
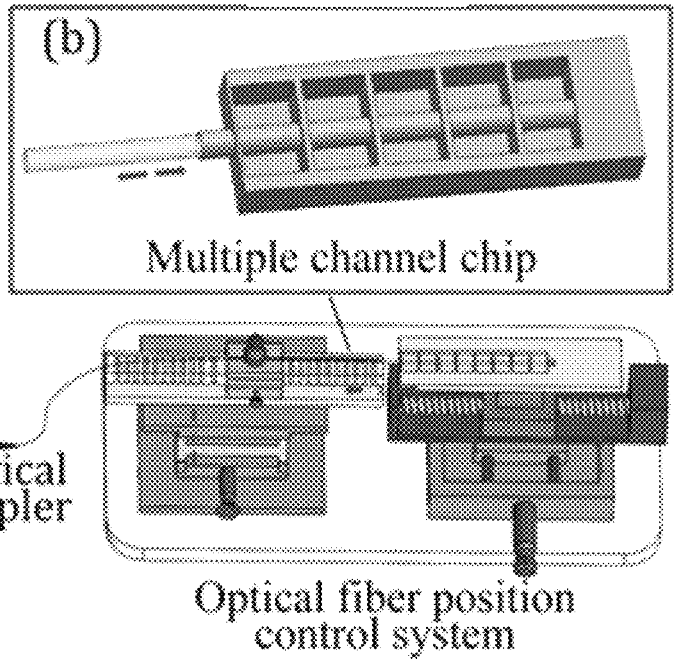

FIG. 26A
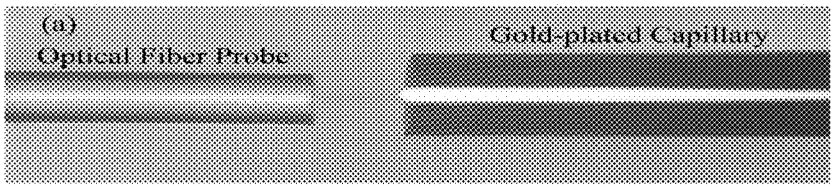
FIG. 26B
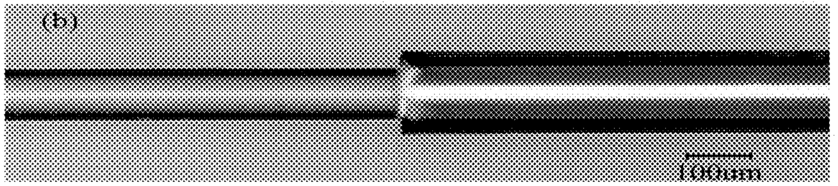
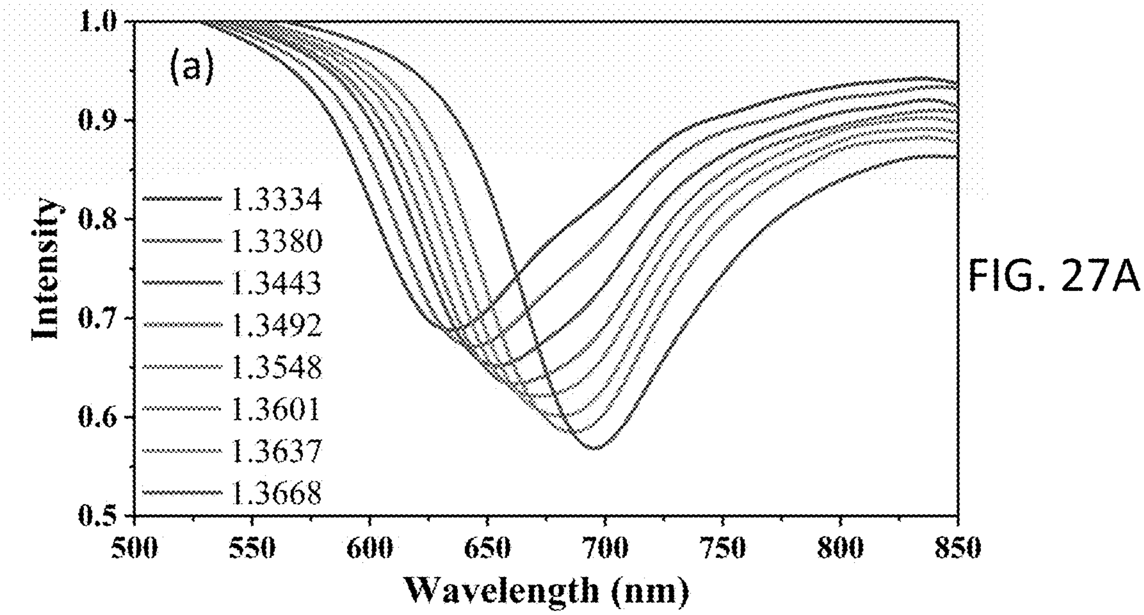
FIG. 27A
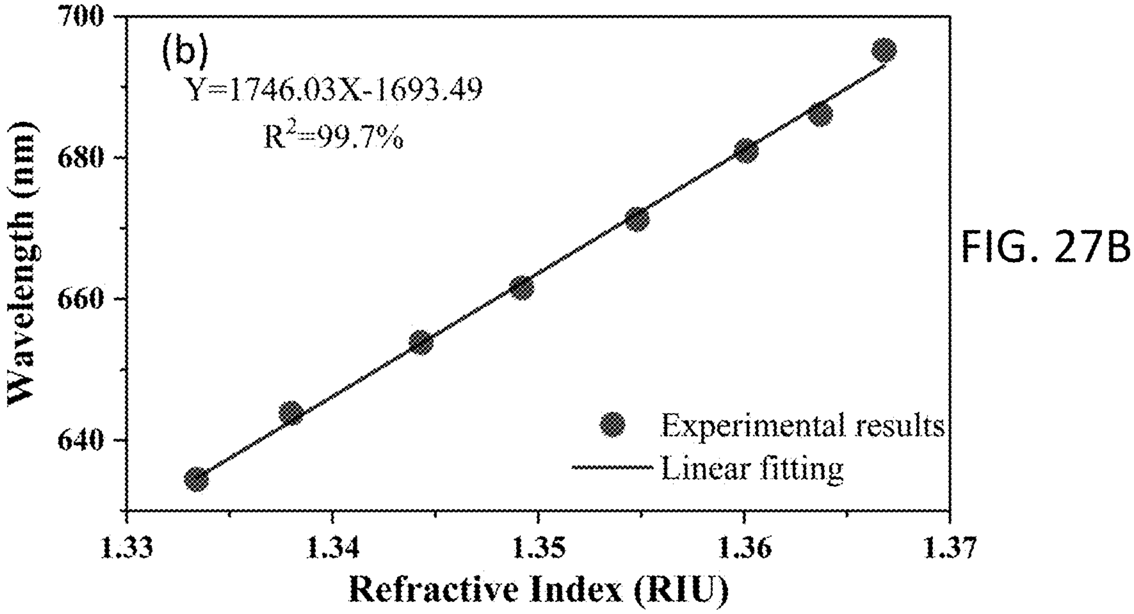
FIG. 27B

FIBER OPTIC SENSING APPARATUS AND SYSTEM

CROSS-REFERENCE TO RELATED APPLICATIONS

The present application claims priority to Chinese Patent Application No. 202110601242.6 filed on May 31, 2021 and Chinese Patent Application No. 202123060280.X filed on Dec. 8, 2021. The disclosures of these two patent applications are hereby incorporated by reference in their entirety.

FIELD OF THE INVENTION

The present invention relates generally to the technical field of optical fiber sensing technologies, and more specifically relates to a fiber-optic sensing apparatus and system.

BACKGROUND

Fiber-optic sensors or optical fiber sensing devices are commonly based on the principle of refractive index sensing, and have been playing an important role in a variety of fields which include chemical, biochemical or biological analysis, clinical diagnosis, environmental monitoring, and chemical quality control, etc. Fiber optic sensors have the advantages of high sensitivity, fast response time, compact sizes, mechanical robustness, and multiplexing capability.

To realize optical fiber detection such as biochemical or chemical sensing, usually appropriate surface modifications are required, wherein a biochemical functional layer with a specific recognition function is introduced on the surface of the optical fiber sensing device to realize the specific capture of, and/or to realize the specific response to, the substance to be tested. Usually this functional layer cannot be reused, and the chemically treated optical fiber surface is difficult to restore to its untreated state. Therefore, in general, these fiber optic sensing devices are single-use devices.

As such, fiber optic chemical or biochemical sensors still face three challenges in their practical applications. First of all, the use of an optical fiber sensing device as a consumable material greatly increases the usage cost, which is disadvantageous to the commercial promotion of the product. Secondly, there is a high requirement for the consistency and efficiency in manufacturing the optical fiber sensing device, and currently it remains an urgent challenge to be able to mass-produce the optical fiber sensing devices with a consistent performance. Finally, the existing coupling method between the optical fiber sensor, the light source, and the detector is not complicated and inconvenient, and is usually associated with high costs.

SUMMARY

In order to address the aforementioned issues associated with existing fiber optical chemical or biochemical sensors, the present disclosure provides a fiber-optic sensing apparatus and a fiber-optic sensing apparatus comprising the fiber-optic sensing apparatus.

The fiber-optic sensing apparatus includes an outer sleeve, an optical fiber sensor, and a filling medium. The optical fiber sensor is arranged in an inner space of the outer sleeve. The filling medium is arranged to fill a gap between the optical fiber sensor and the outer sleeve. The outer sleeve and the filling medium are configured such that the optical fiber sensor is capable of detecting a change of a refractive index or a change of surface plasmon waves over an outer surface of the outer sleeve.

Herein preferably, a refractive index of the filling medium and a refractive index of the outer sleeve are configured to be matching, i.e. the refractive index of the filling medium is within 5% deviation of the refractive index of the outer sleeve.

More preferably, the refractive index of the filling medium is within 5% deviation of the refractive index of the outer sleeve.

According to some embodiments of the fiber-optic sensing apparatus, the refractive index of the outer sleeve is in a range of 1.33-3.00, and the refractive index of the filling medium is in a range of 1.33-1.80.

According to some embodiments of the fiber-optic sensing apparatus, the outer sleeve has a composition of quartz glass, and the filling medium has a composition of an oil with a refractive index of approximately 1.46 (e.g. 1.4608).

According to some embodiments of the fiber-optic sensing apparatus, the outer surface of the outer sleeve directly contacts an outside medium. As such, the fiber-optic sensing apparatus is capable of detecting the change of refractive index of the outside medium so as to characterize the outside medium. As used herein, the outside medium is substantially the medium in which the fiber-optic sensing apparatus is disposed in so as to perform a sensing activity for characterization. Non-limiting examples of an outside medium can include a gaseous medium (e.g. air) or can be a liquid medium (e.g. aqueous solution).

According to some embodiments, the fiber-optic sensing apparatus further comprises a coating layer assembly, which is arranged to coat the outer surface of the outer sleeve, and comprises at least one film layer.

According to some embodiments, the coating layer assembly comprises a reactive film layer, configured such that an outer surface of the reactive film layer is reactive to a target molecule in an outside medium. Such reaction of the reactive film layer can optionally be reversible or alternatively irreversible. Preferably, the reactive film layer comprises a composition that is capable of reversibly reacting with the target molecule, thereby causing the reaction of the reactive film layer to the target molecule to be reversible to thereby allow the detection to have a high repeatability and reliability, and a low cost.

According to some embodiments, the coating layer assembly comprises a base film layer configured to be reactive to surface plasmon resonance (SPR). As such, the base film layer may comprise a metal material, such as gold (Au), silver (Ag), platinum (Pt), aluminum (Al), copper (Cu), or an alloy thereof; or optionally may comprise at least one of a semiconductor material, a metal oxide, a two-dimensional (2D) material, or an optical metamaterial.

Optionally, the coating layer assembly may further comprise a protective film layer arranged over an outer surface of the base film layer, which serves to protect an integrity of the base film layer, and may optionally comprise a diamond film layer, a silicon film layer, or may have a composition of at least one of indium tin oxide (ITO), zinc peroxide ($ZnO_2$), tin oxide ($SnO_2$), or indium oxide ($In_2O_3$), etc.

Optionally, the coating layer assembly may further comprise a transition film layer arranged between the outer surface of the outer sleeve and an inner surface of the base film layer, which can improve adhesion of the base film layer to the outer sleeve, and may optionally comprises a metal composition such as titanium (Ti), molybdenum (Mo), chromium (Cr), or an alloy thereof.

According to some embodiments of the fiber-optic sensing apparatus, the coating layer assembly is configured such that an outer surface thereof comprises a plurality of microstructures to thereby obtain an increased relative surface area.

Optionally in the fiber-optic sensing apparatus, the optical fiber sensor can be a transmission-mode optical fiber sensor, or can be a reflection-mode optical fiber sensor. In the latter situation, the optical fiber sensor comprises a mirror at one end surface thereof.

According to some embodiments of the fiber-optic sensing apparatus, the optical fiber sensor comprises a single-mode optical fiber. The single-mode optical fiber comprises a core and a cladding surrounding the core, and the core is provided with a grating structure selected from a group consisting of fiber Bragg gratings (FBGs), tilted fiber Bragg gratings (TFBGs), and long-period fiber gratings (LPFGs).

Herein according to some preferred embodiments, the core of the single-mode optical fiber is provided with a tilted fiber Bragg gratings (TFBGs) having an internal tilt angle in a range of approximately 5-25 degrees.

Herein according to some preferred embodiments, a refractive index of the cladding of the single-mode optical fiber, a refractive index of the filling medium, and a refractive index of the outer sleeve are configured to be matching with one another. In other words, in these preferred embodiments, the cladding of the single-mode optical fiber, the filling medium, and the outer sleeve are configured to have matching refractive indices.

According to some embodiments of the fiber-optic sensing apparatus, the optical fiber sensor comprises a combination of at least one multimode optical fiber and at least one single-mode optical fiber; or a combination of at least one multimode optical fiber and at least one coreless optical fiber.

Herein according to some embodiments, the optical fiber sensor may comprise one multimode optical fiber and one single-mode optical fiber fused with one another, and the one multimode optical fiber and the one single-mode optical fiber are arranged in a light-transmission direction in the optical fiber sensor.

Herein according to some other embodiments, the optical fiber sensor may comprise one multimode optical fiber and one coreless optical fiber fused with one another, wherein the one multimode optical fiber and the one coreless optical fiber are arranged in a light-transmission direction in the optical fiber sensor.

Herein, the fiber-optic sensing apparatus further comprises a coating layer assembly, arranged to coat the outer surface of the outer sleeve, and the coating layer assembly at least comprises a base film layer configured to be reactive to surface plasmon resonance (SPR).

According to some embodiments, the fiber optic sensing apparatus may further comprise at least one additional optical fiber sensor, and the optical fiber sensor and the at least one additional optical fiber sensor are all arranged in the inner space of the outer sleeve.

BRIEF DESCRIPTION OF THE DRAWINGS

FIG. 20 illustrates the schematic diagram of the experimental setup in this Example;

FIGS. 21A-21D shows the characteristics of the hybrid TFBG-capillary device, with FIG. 21A showing typical spectra of the hybrid TFBG-capillary devices with different outer diameters and a bare TFBG, FIG. 21B showing magnified view of the hybrid TFBG-capillary and bare TFBG spectra, FIG. 21C showing the simulated spectrum of the hybrid TFBG-capillary device as a function of the outer diameter, and FIG. 21D showing evolution of the FSR of the cladding modes as a function of the outer diameter at around 1550 nm. (Single-mode fiber, grating pitch: 1117.24 nm, tilt angle: 12°);

FIG. 24 illustrates a schematic diagram of the structure of the heterocore optical fiber and gold-plated quartz tube in Example 4 of the disclosure;

FIG. 25A and FIG. 25B respectively show the experimental setup of the heterocore optical fiber and gold-plated quartz tube multichannel SPR sensor, and the schematic diagram of the multi-channel chip structure;

FIG. 26A and FIG. 26B are respectively the 20×microscopic imaging before the fiber probe extends into the gold-coated quartz tube and the 20×microscopic imaging when the fiber probe is inside the gold-coated quartz tube;

FIG. 27A and FIG. 27B show the response of reflection spectrum of an MSM fiber SPR probe, with FIG. 27A showing the SPR spectrum response to different solution refractive index, and FIG. 27B showing the relation between the resonance wavelength and the refractive index, where the fit goodness coefficient is $R^2$=99.7%;

DETAILED DESCRIPTION

Figure 1:
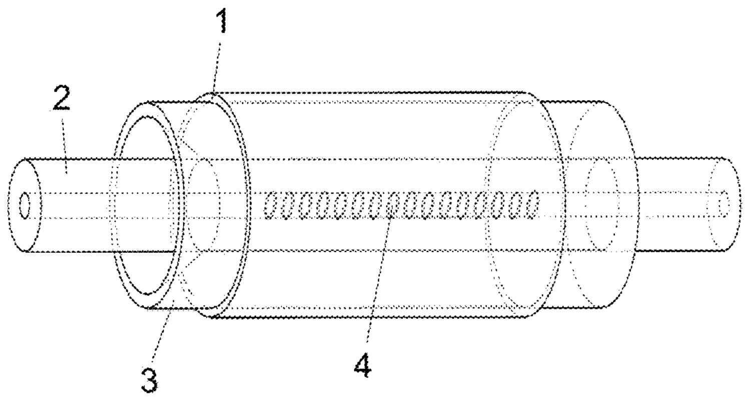
FIG. 1 and FIG. 2 respectively illustrates a perspective view and a cross-sectional view of the fiber-optic sensing apparatus in Example 1 of the disclosure.

In a first aspect, the present disclosure provides a fiber-optic sensing apparatus capable of detecting certain characteristics of an outside medium (e.g. aqueous solution, air, etc.) where the sensing apparatus is disposed.

The fiber-optic sensing apparatus includes an outer sleeve and an optical fiber sensor that is arranged within in the inner space of the outer sleeve. A filling medium is arranged to fill a gap between the optical fiber sensor and the outer sleeve. The outer sleeve and the filling medium are configured such that the optical fiber sensor is capable of detecting a change of a refractive index or a change of surface plasmon waves over an outer surface of the outer sleeve.

According to some embodiments of the fiber-optic sensing apparatus, it is further configured such that a refractive index of the filling medium and a refractive index of the outer sleeve are matching. As used herein, the phrase "a refractive index of substance A and a refractive index of substance B are matching" is referred to as a situation where the refractive index of substance A is within 10%, or preferably within 5%, or more preferably within 2%, or even more preferably within 1%, deviation of the refractive index of substance B. In one illustrating yet non-limiting example, when the substance B has a refractive index of 1.50 and the preset threshold percentage is 10%, then if the substance B has a refractive index that is between 1.35 (i.e. −10% deviation) and 1.65 (i.e. +10% deviation), substance B is regarded to have a matching refractive index compared to substance A, or that substance B and substance A are regarded to have a matching refractive index.

According to some embodiments of the fiber-optic sensing apparatus, the refractive index of the outer sleeve is in a range of 1.33-3.00. Optionally, the outer sleeve can have a transparent composition. As such, the outer sleeve can have a composition of a transparent polymer, such as polystyrene, polyethylene, polycarbonate, polymethyl methacrylate, polyethylene terephthalate, or epoxy resin, etc. Alternatively, the outer sleeve can have a composition of a transparent glass, such as silicate glass, quartz glass borate glass, phosphate glass, chalcogenide glass, or fluoride glass, etc.

According to some embodiments of the fiber-optic sensing apparatus, the refractive index of the filling medium is in a range of 1.33-1.80. Optionally, the filling medium can be a liquid, a gel, or a solidified polymer.

According to some embodiments of the fiber-optic sensing apparatus, the outer sleeve has a composition of quartz glass, and the filling medium comprises a refractive index-matching oil, which has a refractive index of approximately 1.46 (e.g. 1.4608).

Herein, in the fiber-optic sensing apparatus, an outer sleeve may optionally take a form of a hollow tube or hollow cylinder, and it is configured such that the inner diameter of the outer sleeve is greater than the diameter of the optical fiber sensor to thereby allow the optical fiber sensor to be arranged within the inner space of the outer sleeve.

There can optionally be a variety of different configurations for the outer sleeve. In terms of the shape, the cross-section of the outer sleeve can take a shape of a circle, a square, an oval, a polygon (e.g. pentagon, hexagon, etc.), or anything that is special-shaped. In terms of the sizes, the outer sleeve can have different inner and outer diameters, and optionally, the outer sleeve may have an inner diameter in a range of 10-2000 μm, and have an outer diameter in a range of 12-2500 μm, and the outer diameter is greater than the inner diameter. According to some embodiments that are used as examples, the outer sleeve has an inner diameter between 126 and 140 μm and can be termed "capillary" or "transparent capillary" as such.

Accordingly to some embodiments, one end portion of the outer sleeve can be further configured to have a bell-shaped mouth, i.e. this end portion has a widening or greater inner diameter compared with other portion of the outer sleeve, so as to bring convenience to insert the optical fiber sensor into an inside of the outer sleeve during assembly.

According to some embodiments, the outer sleeve has only one inner hole to accommodate one single optical fiber sensor. According to some other embodiments, the outer sleeve has at least two inner holes. As such, the outer sleeve can accommodate more than one optical fiber sensor, thereby allowing the simultaneous measurements of multiple different parameters (where each optical fiber sensor is configured for measuring a different parameter), or allowing the multi-channel measurement of one single parameter (where each optical fiber sensor is configured for measuring a same parameter). One or more inner holes of the inner sleeve can optionally be configured as a microfluidic channel to thereby realize a "microfluidic chip" type apparatus.

According to some embodiments, there can be more than one outer sleeve nested with one another (i.e. one outer sleeve is inside the inner hole of another outer sleeve), with the optical fiber sensor arranged inside the inner hole of the smallest outer sleeve.

There can optionally be a variety of different configurations for the optical fiber sensor. In terms of the sizes, the optical fiber sensor may have a diameter in a range of 8-1990 and the diameter shall be smaller than the inner diameter of the outer sleeve. According to some embodiments of the fiber-optic sensing apparatus used in the examples below, the optical fiber sensor has a diameter of 125 arranged in the outer sleeve having an inner diameter between 126 and 140 μm. Optionally, the optical fiber sensor is configured to have a tapered end portion, or that the cross-section of one end portion of the optical fiber sensor has a trapezoidal shape, both of which brings the convenience for inserting the optical fiber sensor into the outer sleeve during assembly of the fiber-optic sensing apparatus.

According to some embodiments of the fiber-optic sensing apparatus, the optical fiber sensor can be of a reflective type, with both the incident light and emitting light transmitting one end of the optical fiber sensor. As such, the other end of the optical fiber sensor is coated with a reflective film, which may have a composition of a metal such as gold (Au), silver (Ag), or copper (Cu), and have a thickness of 30-50 nm, and is configured to have a reflective surface facing toward the inside the optical fiber sensor. Herein, the outer sleeve can be configured to have only one open end (i.e. the other end is closed) to thereby form a one ended tube, and use of this reflective type of the optical fiber sensor allows the fiber-optic sensing apparatus to substantially form a sensing probe, which may bring convenience for the practical use of the sensing apparatus.

According to some other embodiments of the fiber-optic sensing apparatus, the optical fiber sensor can be of a transmissive type, with the incident light and emitting light transmitting at different ends of the optical fiber sensor.

The optical fiber sensor can be of various types. Optionally, the optical fiber sensor can comprise a single-mode optical fiber, and the single-mode optical fiber comprises a core and a cladding surrounding the core. The core of the optical fiber can optionally be provided with a grating structure selected from a group consisting of fiber Bragg gratings (FBGs), tilted fiber Bragg gratings (TFBGs), and long-period fiber gratings (LPFGs). Preferably, the optical fiber sensor comprises an optical fiber with TFBGs, having an internal tilt angle in a range of approximately 5-25 degrees. Herein according to some preferred embodiments, a refractive index of the cladding of the single-mode optical fiber, a refractive index of the filling medium, and a refractive index of the outer sleeve are configured to be matching with one another. In other words, in these preferred embodiments, the cladding of the single-mode optical fiber, the filling medium, and the outer sleeve are configured to have matching refractive indices. In one illustrating example, the cladding of the single-mode optical fiber and the outer sleeve can have a composition of quartz glass, and the filling medium comprises a refractive index-matching oil having its refractive index of 1.4068.

According to some other embodiments, the optical fiber sensor comprises a combination of a singlemode/single-mode optical fiber, a multimode/multi-mode optical fiber, and a coreless optical fiber, and can, for example, be a singlemode-multimode-singlemode fiber (i.e. an optical fiber sequentially comprising a singlemode portion, a multimode portion, and a single-mode portion), a singlemode-coreless-singlemode fiber, a multimode-singlemode-multimode fiber, a singlemode-multimode-end inversion device, a singlemode-coreless-end inversion device, a multimode-singlemode-end inversion device, etc.

Herein, when lights transmit through these optical fibers in the optical fiber sensor, especially when lights transmit from a multimode fiber to a singlemode fiber or from a multimode fiber to a coreless fiber, because the cores of these fused optical fibers do not match, the light from the core can be coupled to the cladding of the optical fiber. In the presence of an SPR-active base film layer (e.g. a gold film layer) coating the outer sleeve, the evanescent waves in the cladding mode can excite the generation of surface plasmon waves on the outer surface of the base film layer to thereby allow the optical fiber sensor to characterize the outside medium where the fiber-optic sensing apparatus is disposed. Therefore, according to some preferred embodiments, the fiber-optic sensing apparatus further comprises a coating layer assembly, arranged to coat the outer surface of the outer sleeve, and the coating layer assembly at least comprises a base film layer configured to be reactive to surface plasmon resonance (SPR).

Further optionally, the optical fiber sensor comprises a combination of at least one multimode optical fiber and at least one single-mode optical fiber; or a combination of at least one multimode optical fiber and at least one coreless optical fiber.

Herein according to some preferred embodiments, the optical fiber sensor may comprise one multimode optical fiber and one single-mode optical fiber fused with one another, and the one multimode optical fiber and the one single-mode optical fiber are arranged in a light-transmission direction in the optical fiber sensor. Further optionally, the cladding of the one single-mode optical fiber and of the one multimode optical fiber, the filling medium, and the outer sleeve are configured to have a matching refractive index with one another. In one specific example, the cladding of the one single-mode optical fiber and of the one multimode optical fiber and the outer sleeve have a composition of quartz glass, and the filling medium comprise a refractive index-matching oil (i.e. RI=1.4608).

Herein according to some other preferred embodiments, the optical fiber sensor may comprise one multimode optical fiber and one coreless optical fiber fused with one another, wherein the one multimode optical fiber and the one coreless optical fiber are arranged in a light-transmission direction in the optical fiber sensor. Further optionally, the cladding of the one multimode optical fiber, the coreless optical fiber, the filling medium, and the outer sleeve are configured to have a matching refractive index with one another. In one specific example, the cladding of the one multimode optical fiber, the coreless optical fiber, and the outer sleeve all have a composition of quartz glass, and the filling medium comprise a refractive index-matching oil (i.e. RI=1.4608).

According to yet some other embodiments, the optical fiber sensor can comprise a micro-nano optical fiber or a 45-degree polished fiber.

There can be different configurations for the fiber-optic sensing apparatus regarding the whole structure formed by the outer sleeve and the optical fiber sensor. According to some embodiments, the outer sleeve and the optical fiber sensor are configured to be co-axial, i.e. along a substantially same axis or their axes are parallel to each other. Yet according to some other embodiments, there is an angle between the axis of the outer sleeve and the axis of the optical fiber sensor, and the angle is preferably smaller than 10 degree.

According to some embodiments, the outer sleeve and the optical fiber sensor are configured to be concentric (i.e. having a common center) in their cross-sections. Yet according to some other embodiments, the outer sleeve and the optical fiber sensor can be non-concentric, and experiments have surprisingly demonstrated that even when there is a large eccentricity for the optical fiber sensor relative to the outer sleeve, such as when the axis of the optical fiber sensor and the axis of the outer sleeve are relatively far apart from each other, i.e. the optical fiber sensor is arranged to be very close to, or even touch, the inner wall of the outer sleeve, the fiber-optic sensing apparatus still works very well.

Depending on the different working mechanisms for the fiber-optic sensing apparatus disclosed herein, the outer sleeve may have different configurations.

According to some embodiments, the outer surface of the outer sleeve is configured to be bare (i.e. without any coating layers, directly contact or directly exposed to the outside medium where the sensing apparatus is disposed). Such a configuration allows the fiber-optic sensing apparatus to be able to detect the change of refractive index over the outer surface of the outer sleeve so as to obtain information associated with certain characteristics of the outside medium, based on which the characteristics of the outside medium can be further derived. In certain such embodiments, the fiber-optic sensing apparatus may be used, for example, as a probe to measure the state of health of certain electrochemical devices (e.g. battery).

According to some other embodiments, the outer surface of the outer sleeve is coated with a coating layer assembly that is reactive to surface plasmon resonance (SPR). Such a configuration allows the fiber-optic sensing apparatus to be able to detect the change of surface plasmon waves over the outer surface of the outer sleeve so as to obtain information associated with certain characteristics of the outside medium, based on which the characteristics of the outside medium can be further derived.

According to yet some other embodiments, the fiber optic sensing apparatus further comprises a coating layer assembly, which is arranged to coat the outer surface of the outer sleeve. The coating layer assembly can optionally have different configurations to realize different functionalities.

Herein optionally, the coating layer assembly may comprise a thin-film material or a nanomaterial. The thin-film material can comprise a metal material (e.g. gold, silver, platinum, palladium, aluminum, or an alloy thereof), a semiconductor material (e.g. silicon, germanium, selenium, chalcogenide glass, indium tin oxide, or zinc oxide, etc.), or a dielectric material (e.g. silicate glass, borate glass, phosphate glass, chalcogenide glass, fluoride glass, polystyrene, polyethylene, polycarbonate, polymethylmethacrylate, poly terephthalate, glycol ester, or epoxy resin, etc.). The thickness of either the semiconductor film or the dielectric film can be in a range of 2-10,000 nm.

The nanomaterial can comprise a metal nanomaterial, a magnetic nanomaterial, a semiconductor nanomaterial, an organic nanomaterial, an inorganic nanomaterial, a two-dimensional material, and the like. In the coating layer assembly, the shape thus formed by the nanomaterial can be one or a combination of the nanospheres, nanorods, nanowires, nanosheets, nanotriangles, nanocubes, nanostars, etc.

In certain embodiments, the coating layer assembly comprises a base film layer configured to be reactive to surface plasmon resonance (SPR), and as such the base film layer optionally comprises a metal material, comprising at least one of gold (Au), silver (Ag), platinum (Pt), aluminum (Al), copper (Cu); or comprises at least one of a semiconductor material, a metal oxide, a two-dimensional (2D) material, or an optical metamaterial. Herein, according to some embodiments, the base film layer has a composition of gold (Au). Optionally, the base film layer can have a thickness in a range of approximately 20-70 nm, and preferably in a range of approximately 30-50 nm. Such a configuration allows the fiber-optic sensing apparatus to be able to detect a change of surface plasmon waves over an outer surface of the outer sleeve.

In certain embodiments, the coating layer assembly further comprises a protective film layer arranged over an outer surface of the base film layer. The protective film layer is configured to protect an integrity of the base film layer, and optionally can comprise a diamond film layer, a silicon film layer, or can optionally have a composition of at least one of indium tin oxide (ITO), zinc peroxide ($ZnO_2$), tin oxide ($SnO_2$), or indium oxide ($In_2O_3$), or can optionally have a composition of a polymer such as polyethylene (PE), polypropylene (PP), polytetrafluoroethene (PTFE).

In certain embodiments, the coating layer assembly further comprises a transition film layer arranged between the outer surface of the outer sleeve and an inner surface of the base film layer. The transition film layer is configured to improve adhesion of the base film layer to the outer sleeve, and optionally can comprise at least one of titanium (Ti), molybdenum (Mo), or chromium (Cr).

More examples and details for the SPR-reactive film layer, the protective film layer, and/or the transition film layer, as well as the fabrication method thereof, are provided in WO2020238830A1, WO2022037589A1, US20210025945A1, U.S. Ser. No. 10/718,711B1, and U.S. Ser. No. 10/845,303B2, whose disclosures are hereby incorporated by reference in their entirety.

In certain embodiments, the coating layer assembly comprises a reactive film layer, configured such that an outer surface of the reactive film layer is reactive to a target molecule in an environment. Herein, the term "reactive film layer" is referred to as a film layer that is in direct contact with the environment where the fiber-optical sensing apparatus is disposed, and that substantially provides a reaction surface for a reaction between the fiber-optical sensing apparatus and the target molecule in the environment. The reaction with the target molecule on the surface of the reactive film layer can substantially cause a change of refractive index and/or a change of SPR, thereby allowing the sensing apparatus to characterize (e.g. qualify or quantify) the target molecule in the environment.

Herein according to some embodiments, the reactive film layer may comprise one or more reactive compositions that can directly react with the target molecule in the environment.

In certain embodiments, such reactive compositions may include Pd, La-Mgs-Ni, $WO_3$, $SnO_2$, etc., which can be used in the reactive film layer of the coating layer assembly that coat the outer surface of the outer sleeve of the fiber-optic sensing apparatus for the detection of certain gas molecules such as hydrogen ($H_2$), ammonium ($NH_3$), $H_2S$, methane ($CH_4$), $NO_2$, CO, NO, $CH_2O$, or $C_6H_6$, etc. in the air. More examples and description of such reactive compositions to be used in a reactive film layer for optical fiber-based gas detection can be found in U.S. Ser. No. 10/718,711B1 and U.S. Ser. No. 10/845,303B2.

In certain other embodiments, such reactive compositions may include certain molecules or functional groups that can specifically recognize and bind the target molecule in the outside medium. Examples of such reactive compositions may include antibodies, aptamers, polypeptides, etc., which can be used in a reactive film layer in a fiber-optic sensing apparatus for the biochemical detection of certain proteins, DNAs, RNAs, antibiotics, viruses, bacteria, cells, etc. in a liquid sample, such as in a liquid biopsy sample obtained from a human subject. More examples and description of such reactive compositions to be used in a reactive film layer for optical fiber-based gas detection can be found in the articles (Liu et al. 2015; Zhou et al. 2018; Liu et al., 2021; Hu et al. 2018; and Guo et al. 2014)

Herein according to some other embodiments, the reactive film layer may, upon application of an electrical potential, substantially provide electrons to the target molecule to allow the redox reaction to occur on the surface, thereby causing the change of refractive index and/or the change of SPR to allow the characterization of the target molecule by means of the fiber-optic sensing apparatus. In one embodiment, the reactive film layer may comprise a film layer that is both electrically conductive (e.g. a metal film layer or a conductive semiconductor or metal oxide layer) and SPR-active, and the fiber-optic sensing apparatus having such an electrically conductive and SPR-active film layer on the outer surface of the outer sleeve may be used as a working electrode to measure the concentrations of certain molecules in an aqueous solution, such as ions of metals including lead (Pb), mercury (Hg), copper (Cu), zinc (Zn), cobalt (Co), ion (Fe), nickel (Ni), arsenic (Ar), and chromium (Cr), etc. More examples for the use of such film layer for optical fiber detection of metal ions can be found in WO2020238830A1.

According to any of the embodiments described above, the reactive film layer is configured such that the reaction is reversible to thereby allow for repeated detection with high reproducibility.

In certain embodiments, the coating layer assembly is configured such that an outer surface thereof comprises a plurality of microstructures to thereby allow the outer surface of the coating layer assembly to have an increased specific surface area. As such, the outer surface of the coating assembly can optionally comprise a plurality of subtractive microstructures and/or a plurality of additive microstructures. In situations where a plurality of subtractive microstructures are included in the modified outer surface, they can include porous microstructures or winkle-like microstructures, or both. In situations where a plurality of additive microstructures are included in the modified outer surface, they can comprise nanoparticle microstructures, nanotube microstructures, or nanofilm microstructures, or any of their combinations. Examples of the composition of the plurality of additive microstructures can comprise graphite, graphene, carbon nanoparticles, carbon nanotubes, a metal oxide, a two-dimensional material, an optical metamaterial, or any of their combinations. More examples and description of the microstructures that can be applied in a fiber-optical sensing apparatus can be found in WO2020238830A1.

The fiber-optic sensing apparatus disclosed herein can be configured to realize a multiplexing. According to some embodiments of the fiber-optic sensing apparatus, the coating layer assembly that coats the outer surface of the outer sleeve can be functionally divided into at least two functional areas, which can be along the axial direction or along the circumferential direction. Each functional area has a different configuration (e.g. having a different composition and structure) to thereby have a different detection functionality/capability.

Correspondingly, a plurality of optical fiber sensors can be inserted into a common outer sleeve to measure each functional area respectively, thereby realizing the spatial division multiplexing. According to some embodiments of the fiber-optic sensing apparatus, a single optical fiber with multiple optical fiber sensors connected in series can be used to realize a "spatial division multiplexing". Alternatively, according to some other embodiments of the fiber-optic sensing apparatus, a single optical fiber sensor can be configured to linearly move along, or to rotate around, the axial direction of the optical fiber sensor to thereby realize a detection of different sensing areas in a scanned manner by means of a "time-division multiplexing". This will allow the building of a highly integrated, high-throughput fiber-optic sensing apparatus.

In a second aspect, the present disclosure further provides a fiber-optic sensing system containing the fiber-optic sensing apparatus as described above in the first aspect.

The fiber-optic sensing system further includes a light source apparatus, which is optically coupled to a first end of, and is configured to provide an input light into, the fiber-optic sensing apparatus so as to allow the light or electromagnetic radiation to propagate in the optical fiber of the sensing apparatus. The sensing system further includes a signal detection apparatus, which is coupled to the sensing apparatus and is configured to obtain the signals of the surface plasmon waves therefrom so as to derive the information of the at least one target molecule in the gaseous medium.

According to some embodiments of the sensing system, the light source apparatus comprises a broadband source (BBS), and the signal detection apparatus comprises an optical spectrum analyzer (OSA).

According to some other embodiments of the sensing system, the light source comprises a tunable laser source (TLS). The signal detection apparatus comprises an optical detector, which is configured to detect, and to convert into analog electrical signals, the signals of the plasmon waves from the sensing apparatus. The signal detection apparatus further includes an analog-to-digital converter, which is configured to convert the analog electrical signals into digital electrical signals.

According to yet some other embodiments of the sensing system, the signal detection apparatus is coupled to the first end of the optical fiber, and a second end of the optical fiber is provided with a mirror having a reflection surface facing to, configured to reflect the light or the electromagnetic radiation back towards, the first end of the optical fiber. The sensing system further comprises a coupler, which is arranged between the light source apparatus and the sensing apparatus along an input optical pathway and between the sensing apparatus and the signal detection apparatus along an output optical pathway. The coupler is configured to separate the input optical pathway and the output optical pathway to thereby allow the signal detection apparatus to obtain the signals of the surface plasmon waves from the sensing apparatus without being influenced by the input light.

More details and explanation for the fiber-optic sensing system, as well as a method using the fiber-optic sensing system can be referenced to U.S. Ser. No. 10/718,711B1, and U.S. Ser. No. 10/845,303B2.

Compared with existing fiber-optic sensing devices, the fiber-optic sensing apparatus disclosed herein have the following advantages:

1) In the fiber-optic sensing apparatus, an outer sleeve (e.g. transparent capillary) substantially replaces the outer surface of a regular optical fiber sensor, and thus the various coatings (e.g. the base film layer, the reactive film layer, the protective layer, and/or the transition layer, etc.) and modifications (e.g. reactive film layer, and/or microstructure or etc.) that are typically on the surface of the regular optical fiber sensor are transplanted to the outer surface of the outer sleeve. Due to the low cost and good manufacturing consistency, the outer sleeve can be used as a disposable consumable. Thus the fiber-optic sensing apparatus can be reused for a long time, which greatly reduces the cost of use. It also reduces the requirement for high-volume, high-consistency production for optical fiber sensing devices. At the same time, the coupling connection between the optical fiber sensor, the light source, and the detector does not need to be reconnected in the process of replacing the capillary. It can remain unchanged for a lifetime, which greatly reduces the operation difficulty and workload during the use of the sensor. The system stability and consistency are improved, and the problems and challenges faced in the practical process of the optical fiber biochemical sensor can be well solved. It provides practical solutions for the practical application of optical fiber biochemical sensors.

2) For general optical fiber biochemical sensors, to realize biochemical sensing, the surface of the optical fiber is typically coated with a biochemical functional layer through appropriate surface chemical modification. Generally, these chemical surface modifications are not recoverable, so existing fiber-optic biochemical sensors are generally single-use devices. However, the fiber-optic sensing apparatus disclosed herein utilizes a structure in which the optical fiber sensor is inserted into the outer sleeve, and the gap is filled with transparent matching material. The sputtered metal film or further biochemically modified area are now transferred to the outer surface of the outer sleeve. Separation of the optical fiber portion and the coated/modified portion can thus be realized, enabling a single optical fiber sensing device to be reused.

3) In embodiments of the fiber-optic sensing apparatus where the tilted Bragg fiber grating (TFBG) is used, because the gap between the optical fiber sensor and the outer sleeve is filled with a refractive index-matching medium (e.g. oil), it can be regarded as an optical fiber with a much thicker cladding. People skilled in the art appreciates the fact that for tilted fiber Bragg gratings with a thicker cladding, the gaps between the cladding narrowband peaks on the fiber spectrometer spectrum become smaller. Therefore, a denser cladding pattern can be obtained, the detection accuracy can be improved, and the spectral position of the surface plasmon resonance on the fiber optic spectrometer can be better determined.

4). Because the optical fiber part is separated from the coating/modification part, it is not necessary to move the optical fiber sensor that has been connected to the light source coupling and other optical devices when a different testing is to be performed where a different coating/modification is needed. It can be conveniently done by just replacing the outer sleeve outside the optical fiber sensor. Therefore, a more stable connection between the optical fiber and the light source and detectors can be realized.

In order to better described the fiber-optic sensing apparatus and system as covered above, four illustrating examples are provided in the following.

Example 1

In this example, one embodiment of the fiber-optic sensing apparatus that substantially utilizes a tilted fiber Bragg grating (TFBG) as the optical fiber sensor is provided. In this example, TFBGs are inscribed in the core of a single-mode optical fiber (SMF, i.e. "optical fiber sensor") inside a gold-coated quartz capillary (i.e. "outer sleeve") and the air gap is filled with refractive index (RI) matching oil (i.e. "filling medium").

Tilted Fiber Bragg Grating (TFBG) is a research hotspot of fiber-optic sensors in recent years. A tilted grating is optically written into the fiber core, enabling the coupling of light from the core to cladding modes of different orders. If the outer surface of the fiber cladding is coated with a nanometer-thick noble metal thin film, the evanescent field of the cladding mode generated in the fiber can be excited to generate surface plasmon resonance waves. In the output spectrum of the fiber, there will be an absorption dip in the cladding mode region. Surface plasmon resonance waves have very high sensitivity to the ambient refractive index. Therefore, the surface plasmon resonance region can be used to measure the external environment or the surface refractive index (SRI) of the sensor metal film. The above-mentioned changes in the refractive index of the external environment or the surface of the sensor metal film are often caused by changes in the content of atoms, molecules, ions, or nanoparticles in the solution or on the surface of the noble metal film. Therefore, the tilted fiber Bragg grating plasmon resonance sensor provides a reliable method for the analysis of biological and chemical components and electrochemical measurement. Therefore, the tilted fiber Bragg grating plasmon resonance sensor has broad application prospects in the above-mentioned fields of biochemical analysis, disease diagnosis, food safety, electrochemical analysis, battery safety monitoring, and the like.

The application of tilted fiber Bragg grating plasmon resonance sensors to biochemical sensing usually requires a series of chemical treatments on the noble metal thin films on the sensor's outer surface. A layer of biological ligands (protein, nucleic acid, etc.) with a specific recognition function is grafted on its surface to make it have a specific recognition function. In some cases, it is also necessary to modify a layer of nanomaterials with specific functions on the surface of the noble metal film to improve the sensing performance of the sensor. Under normal circumstances, after the above-mentioned sensor is tested once, the surface will be covered with a layer of the substance to be tested, which cannot be restored to the initial state. Therefore, tilted fiber Bragg grating plasmon resonance sensors are often only used once, which greatly increases the cost of use. It also puts forward high requirements for the consistency of fiber optic sensing devices, which becomes a stumbling block for the practical application of tilted fiber Bragg grating biochemical sensors.

Figure 2:
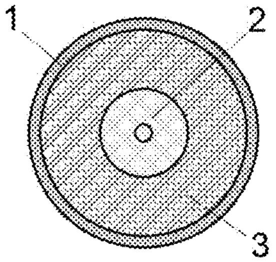

The "tilted fiber Bragg grating+transparent capillary" plasmon resonance sensor as provided herein offers a new feasible solution for solving the above problems, which is substantially one embodiment of the .e. the one embodiment of the fiber-optic sensing apparatus. FIG. 1 and FIG. 2 respectively illustrates a perspective view and a cross-sectional view of such embodiment of the fiber-optic sensing apparatus. As shown in the figures, the fiber-optic sensing apparatus includes a transparent capillary (i.e. outer sleeve) 3 and an optical fiber sensor 2. The optical fiber sensor 2 is substantially a single-mode optical fiber, engraved with a tilted fiber Bragg grating 4 in the core of the fiber. The outer surface of the transparent capillary 3 is coated with a layer of gold film 1 with a thickness of approximately 50 nm. The gap between the optical fiber sensor 2 and the transparent capillary 3 is filled with a refractive index matching liquid with a refractive index of 1.4608. The fiber-optic sensing apparatus can be regarded as a TFBG plasmon resonance sensor with a "transparent capillary+gold nanofilm" layout. Lights in the fiber core can be converted into cladding modes propagating in the cladding using a tilted fiber Bragg grating. Since the cladding of transparent capillary 3 and the optical fiber is made of the same quartz material, the refractive index matching liquid filled in the gap between the transparent capillary 3 and the optical fiber cladding has the same refractive index as the optical fiber cladding. Therefore, the "transparent capillary+refractive index matching liquid+fiber cladding" can be regarded as a new cladding with a larger diameter. Therefore, the cladding mode excited by the tilted fiber Bragg grating can be transmitted in the new cladding layer of "transparent capillary+index matching liquid+fiber cladding". The new cladding mode can also excite the plasmonic resonance waves of the gold nanofilm on the surface of the transparent capillary. Therefore, the refractive index and biochemical substances of the outer surface of the transparent capillary 3 can be detected by the plasmon resonance wave.

Figure 3:
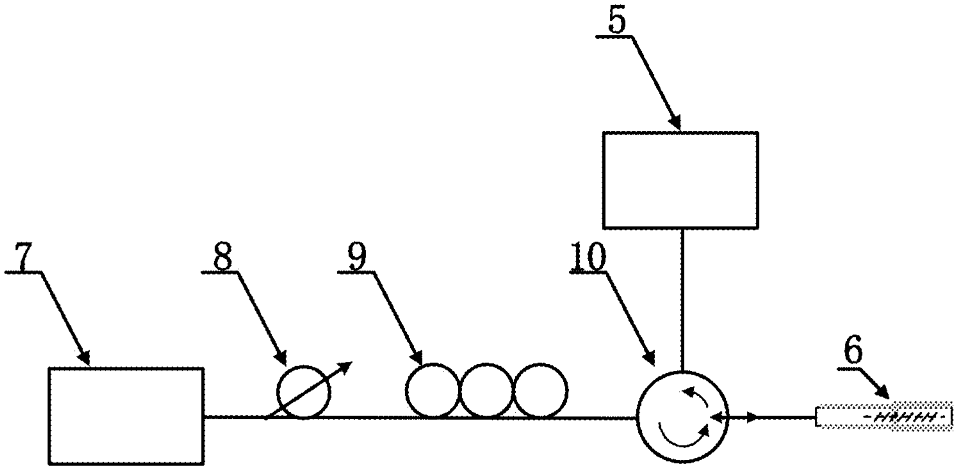
FIG. 3 shows a schematic diagram of a fiber-optic sensing system in Example 1.

As shown in FIG. 3, this embodiment also provides an optical fiber detection system, including an optical fiber spectrometer 5, an outer sleeve optical fiber sensing device 6, a light source 7, a polarizer 8, a polarization controller 9, and a circulator 10. The light source 7, the polarizer 8, the polarization controller 9, and the circulator 10 are connected in sequence. The optical fiber spectrometer 5 is connected to the circulator 10, and the circulator 10 is connected to the outer sleeve optical fiber sensing device 6. The light source 7 is used to generate the probe light, and the polarizer 8 and the polarization controller 9 are used to control the polarization state of the probe light. The fiber optic spectrometer 5 is used to receive the reflected probe light.

Figure 4:
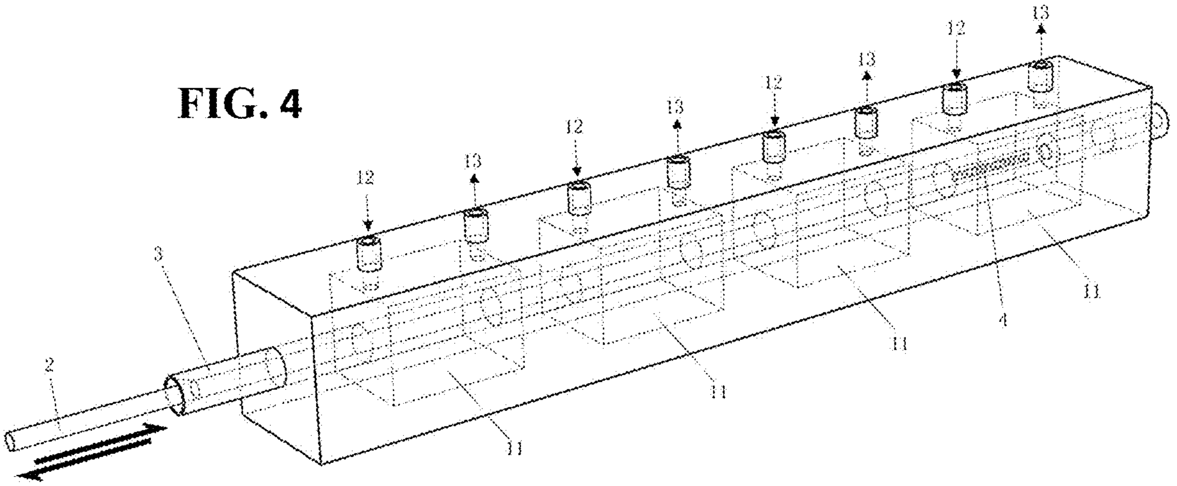
FIG. 4 shows a schematic diagram of certain embodiment of the fiber-optic sensing apparatus that can realize scanned detection.
Figure 5:
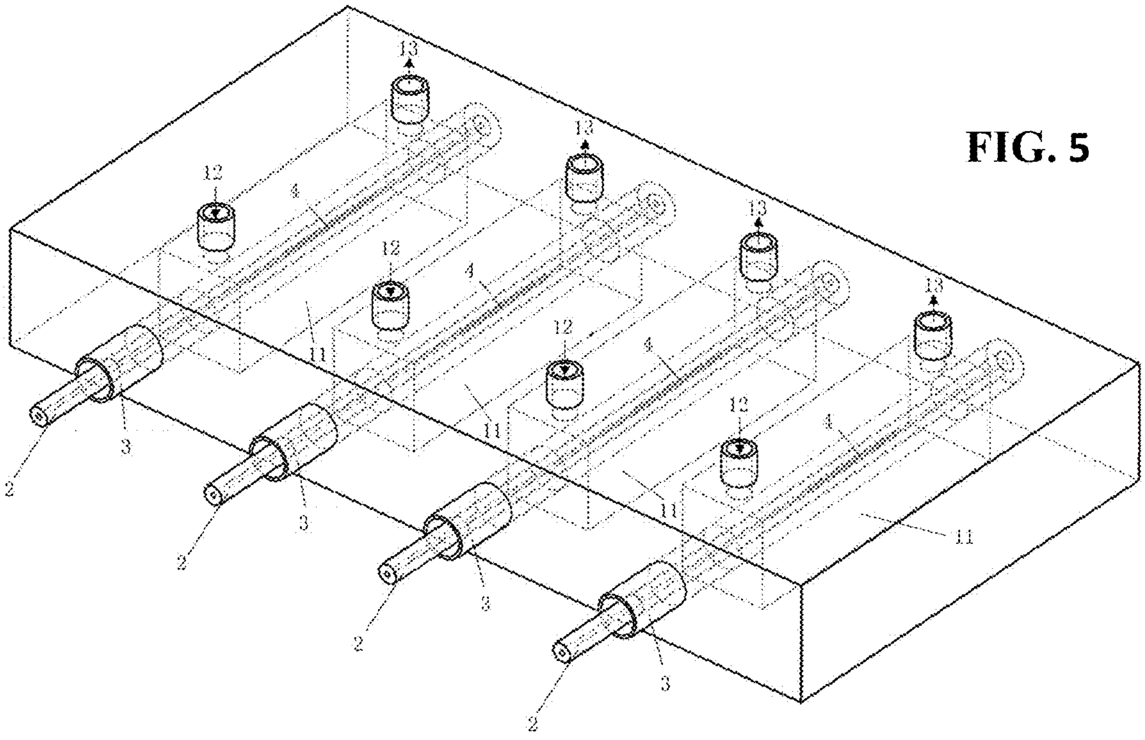
FIG. 5 is a schematic diagram of certain embodiment of the fiber-optic sensing apparatus that can realize multi-channel detection.

In this embodiment, the tilted fiber Bragg grating 4 is written by using an excimer laser and a phase mask. The tilt angle of the tilted fiber Bragg grating 4 is 12 degrees, and the axial length is 10 mm to 20 mm. Light source 1 has a spectrum from 1400 nm to 1620 nm. The spectral range of light source 1 matches the transmission spectral range and the plasmon resonance absorption peak range of the tilted fiber Bragg grating 4. The scanning high-throughput detection of this embodiment is shown in FIG. 4. The multi-channel array detection is shown in FIG. 5.

The method for realizing refractive index detection in this embodiment is as follows: inserting a fiber sensing device engraved with a tilted fiber Bragg grating into a transparent capillary. The outer surface of the transparent capillary is coated with a nanometer-thick metal film. And the gap between the grating and the capillary is filled with oil or gel that matches the refractive index to form an outer sleeve optical fiber sensing device. Connect the light source, polarizer, polarization controller, and circulator in sequence. Connect the fiber optic spectrometer to the circulator and connect the circulator to the outer sleeve fiber optic sensing device. In this way, the output light of the light source is converted into polarized light after passing through the polarizer. The polarization direction of the input polarized light is adjusted to be consistent with the writing direction of the tilted fiber Bragg grating by the polarization controller. The conditioned polarized light is incident into the fiber sensing device through the circulator. The cladding mode generated in the optical fiber sensing device is coupled to the metal film on the outer surface of the capillary and excites the surface plasmon resonance wave of the metal film. This plasmon resonance wave is now an absorption envelope in the spectrum of the fiber optic spectrometer. Combinations of tilted fiber Bragg gratings and metalized thin-film capillaries were exposed to samples of different refractive indices. Changes in the refractive index of the surrounding environment will cause a shift in the absorption envelope. According to the drift of the absorption envelope, the detection of the refractive index change of the surrounding environment is realized.

The method for realizing biochemical detection in this embodiment is as follows: the connection method between the optical fiber sensing device of the outer sleeve and the optical fiber detection system is the same as that of the above-mentioned refractive index detection. To realize the detection of specific biochemical components, it is also necessary to chemically graft a layer of biomolecules or chemical materials with a specific recognition function of the components to be detected on the surface of the capillary. For example, the specific binding of antigen-antibody can be used to make a fiber-optic biosensor: a monolayer of 11-mercaptoundecanoic acid (11-MUA) is assembled on the gold film on the outer surface of the capillary by molecular self-assembly method. Then by 1-(3-dimethyl aminopropyl)-3-ethyl carbodiimide hydrochloride (EDC)+N-hydroxysuccinimide (NHS) treatment, the carboxyl group at the outer end of the 11-MUA molecule can be activated. Furthermore, the antibody can be immobilized on the sensor surface through the shrinkage reaction between the activated carboxyl group and the amino group on the surface of the antibody to form a functional thin film with specific recognition. By rationally selecting an antibody against a certain disease marker protein, the outer sleeve optical fiber sensing device can have the ability to quantitatively analyze the disease marker.

Figure 6:
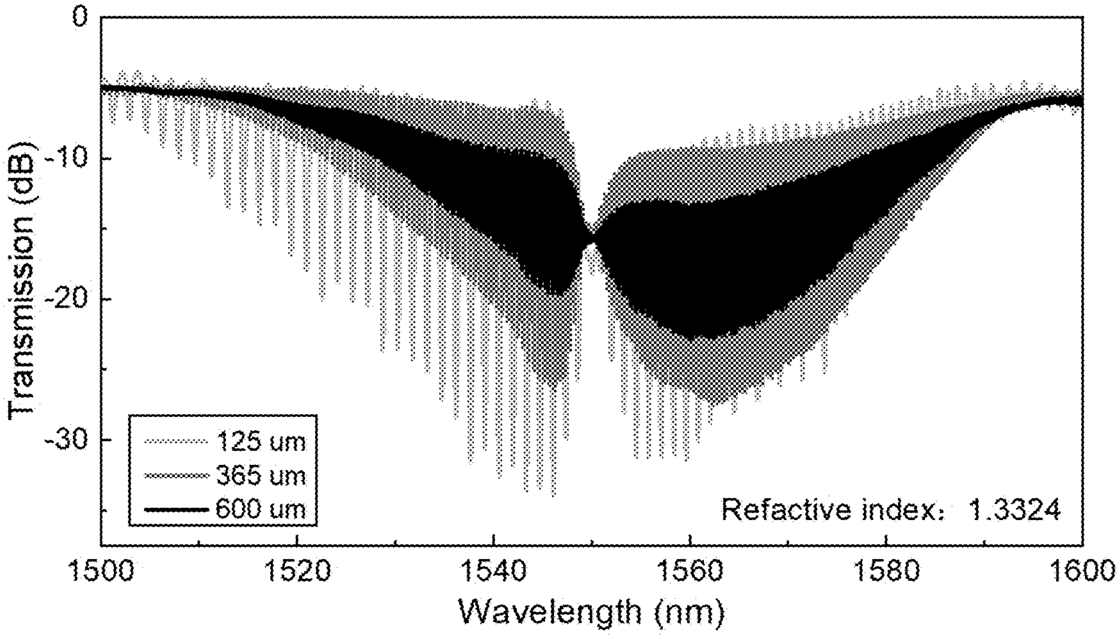
FIG. 6 shows the transmission spectrum of the plasmon resonance sensor with an outer diameter of 125 μm, the "Tilted fiber Bragg grating+transparent capillary tube with an outer diameter of 365 μm", and the plasma resonance sensor of "Tilted fiber Bragg grating+transparent capillary with an outer diameter of 600 μm" plasmon resonance sensor in water.
Figure 7:
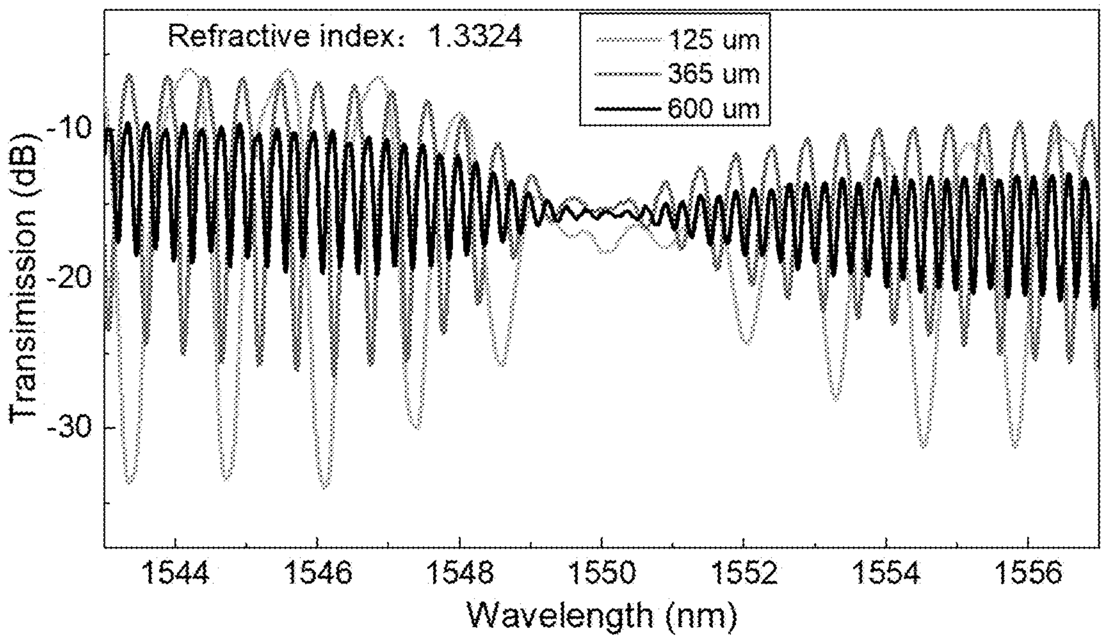
FIG. 7 shows the partially enlarged view of the spectrum of traditional tilted fiber Bragg grating plasmon resonance sensor with an outer diameter of 125 μm, "Tilted fiber Bragg grating+365 μm outer diameter transparent capillary" plasmon resonance sensor, and "tilted fiber Bragg grating+600 μm outer diameter transparent capillary" plasmon resonance sensor in water.

To measure the refractive index of the liquid, the outer sleeve fiber optic sensing device is placed in the sample solution with different refractive indices. And connect the optical fiber sensing device of the outer sleeve with the optical fiber detection system. Refractive index measurements are achieved by tracking the movement of plasmonic resonance waves in the output spectrum. FIG. 6 shows the transmission spectrum of a traditional tilted fiber Bragg grating plasmon resonance sensor with an outer diameter of 125 μm, a "tilted fiber Bragg grating+a transparent capillary with an outer diameter of 365 μm" plasmon resonance sensor, and a "tilted fiber Bragg grating+a transparent capillary with an outer diameter of 600 μm" plasmon resonance sensor in water. Comparing the magnified view of the partial spectrum in FIG. 7, it can be seen that compared with the traditional tilted fiber Bragg grating plasmon resonance sensor with an outer diameter of 125 μm, after adding the transparent capillary, the plasmon resonance absorption peak position in the spectrum has not changed. Moreover, with the increase in the diameter of the outer capillary, the resonance peaks in the output spectrum of the sensor gradually become thinner and denser. Compared with the traditional tilted fiber Bragg grating plasmonic resonance sensor with a diameter of 125 μm, the resonance peak is gradually thinner and denser. This will make the resonance peak envelope of the plasma resonant wave cover more sampling points, and the wavelength interval of the sampling points will be smaller. It is beneficial to extract the plasmon resonance absorption peak of the gold film on the sensor surface more accurately. It can promote the more accurate extraction of the wavelength position of the plasmon resonance peak, thereby improving the overall detection accuracy of the sensor.

Figure 8:
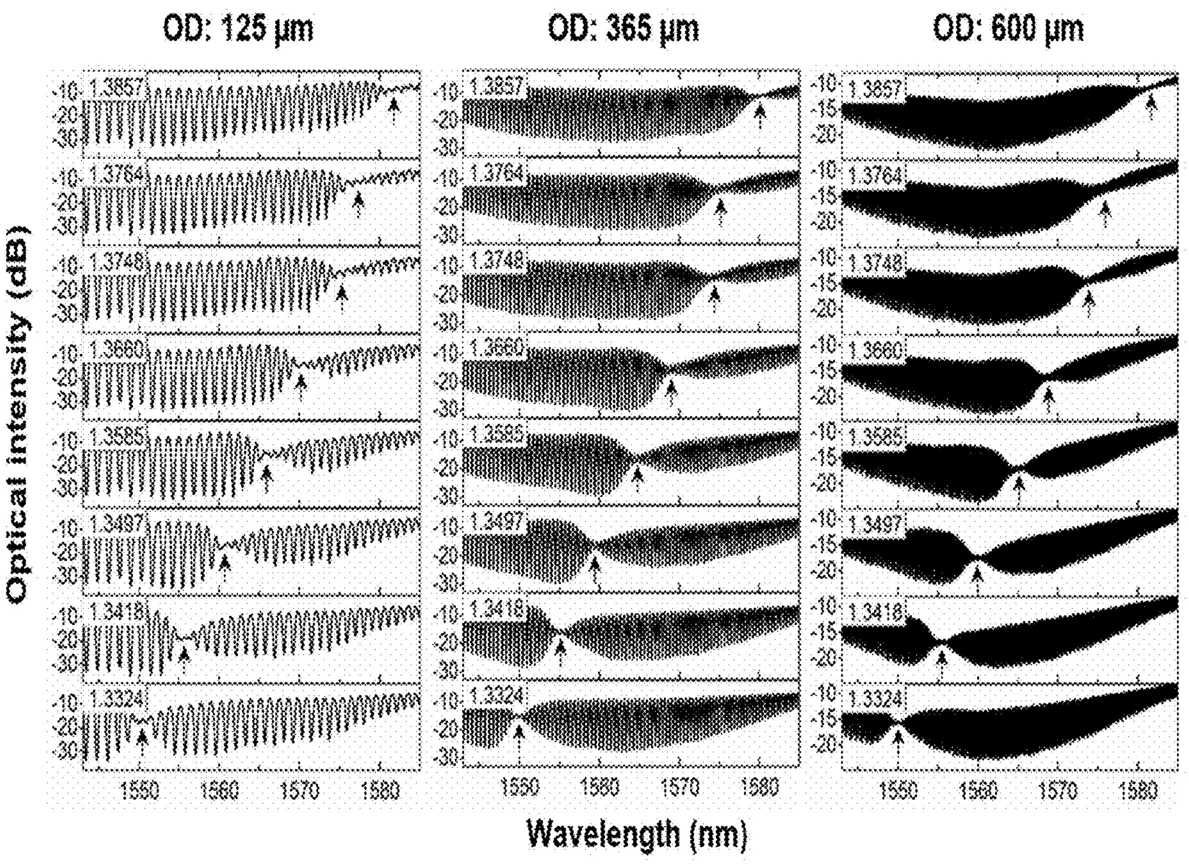
FIG. 8 shows the spectral response of traditional tilted fiber Bragg grating plasmon resonance sensor with an outer diameter of 125 μm, "Tilted fiber Bragg grating+365 μm outer diameter transparent capillary" plasmon resonance sensor, and "tilted fiber Bragg grating+600 μm outer diameter transparent capillary" plasmon resonance sensor in different refractive indices.
Figure 9:
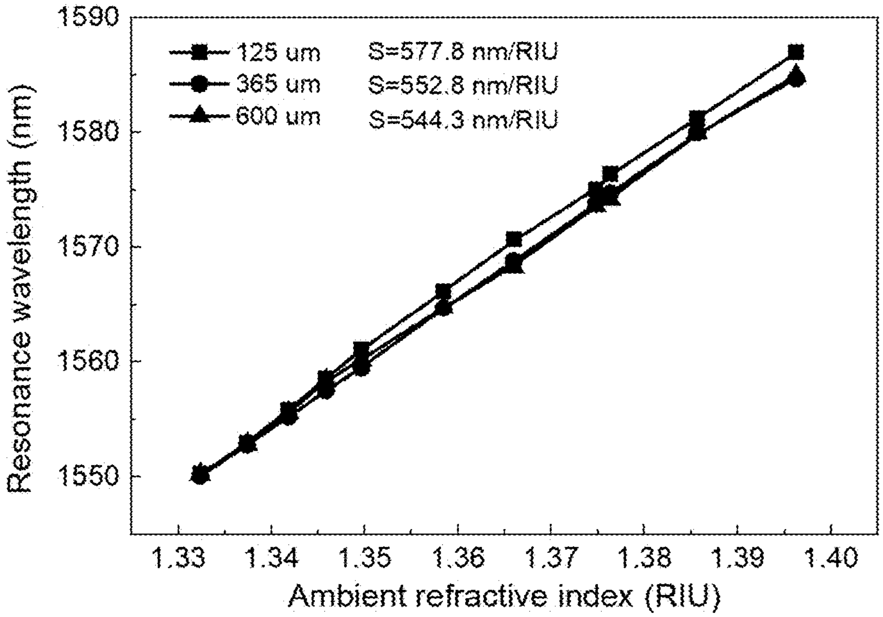
FIG. 9 shows the linear fitting response plot of traditional tilted fiber Bragg grating plasmon resonance sensor with an outer diameter of 125 μm, "Tilted fiber Bragg grating+365 μm outer diameter transparent capillary" plasmon resonance sensor, and "tilted fiber Bragg grating+600 μm outer diameter transparent capillary" plasmon resonance sensor to the external refractive index.

FIG. 8 shows the spectral response of traditional tilted fiber Bragg grating plasmon resonance sensor with an outer diameter of 125 "tilted fiber Bragg grating+365 μm outer diameter transparent capillary" plasmon resonance sensor, and "tilted fiber Bragg grating+600 μm outer diameter transparent capillary" plasmon resonance sensor for different refractive indices. Obviously, after adding the transparent capillary, the sensor is still very sensitive to the refractive index. FIG. 9 shows a linear fitting response plot of the traditional tilted fiber Bragg grating plasmon resonance sensor with an outer diameter of 125 μm "tilted fiber Bragg grating+365 μm outer diameter transparent capillary" plasmon resonance sensor, and "tilted fiber Bragg grating+600 μm outer diameter transparent capillary" plasmon resonance sensor to the external refractive index response. It can be seen that the sensitivity of the sensor remains almost unchanged after adding the transparent capillary. And they all show good linearity, which makes the proposed sensor more convenient in practical applications. More importantly, as the diameter of the transparent capillary increases, the resonance peaks in the output spectrum become thinner and denser. This will make the plasmon resonance peak envelope cover more sampling points, and the wavelength interval of the sampling points will be smaller. It is beneficial to extract the plasmon resonance absorption peak of the gold film on the sensor surface more accurately, to more accurately determine the wavelength position of the plasmon resonance peak. The overall detection accuracy of the sensor is improved. Therefore, the technology of this embodiment can obtain a lower detection limit in practical application, which is suitable for the detection of trace biochemical substances.

To sum up, the outer sleeve fiber sensing device ("tilted fiber Bragg grating+transparent capillary" plasmonic resonance sensor) in this embodiment has many advantages compared with the traditional tilted fiber Bragg grating plasmonic resonance sensor, as follows:

1) The interface for biochemical detection can be transferred from the fiber surface to the transparent capillary surface. Corresponding biological and chemical modifications were carried out on the surface of the transparent capillary. Converting tilted fiber Bragg gratings from consumables to permanent optics. The transparent capillary as a consumable has the same manufacturing precision as the optical fiber. And the manufacturing cost is much lower than the tilted fiber Bragg grating device, which greatly reduces the use cost.

2) The use of tilted fiber Bragg gratings as permanent optical devices makes the connection between fiber sensing devices and light sources and photodetectors also permanent links. It solves the problem of convenient, stable, and efficient coupling between the traditional optical fiber biochemical sensor and the light source and the photodetector during the use of the traditional fiber optic sensor as a consumable.

3) The transparent capillary makes the resonance peaks in the output spectrum of the sensor gradually thinner and denser. It is beneficial to more accurately extract the plasmon resonance absorption peak of the gold film on the sensor surface, and to more accurately determine the wavelength position of the plasmon resonance peak. The addition of clear capillaries did not affect the sensitivity of SPR. Therefore, the detection accuracy of the sensor is improved as a whole.

4) The transparent quartz capillary is used as the external sensitive interface, and the transparent quartz capillary is resistant to high temperatures. Therefore, the present embodiment solves the problem that the conventional devices that are not resistant to high temperatures cannot perform the high-temperature surface treatment.

The refractive index sensing performed in this embodiment is only the simplest application. The "tilted fiber Bragg grating+transparent capillary" plasmon resonance sensor can also be used in the detection of biomolecules, the analysis of chemical components, and the detection of electrochemical reaction processes.

Example 2

In this example, another embodiment of the fiber-optic sensing apparatus that also utilizes a tilted fiber Bragg grating (TFBG) as the optical fiber sensor is provided. In this example, TFBGs are inscribed in the core of a single-mode optical fiber (SMF, i.e. "optical fiber sensor") inside a quartz capillary (i.e. "outer sleeve") and the air gap is filled with refractive index (RI) matching oil (i.e. "filling medium").

In this embodiment, TFBG fiber is used as the optical fiber sensor. The measurement of the true value of the external refractive index is achieved by tilting the cut-off mode of the fiber Bragg grating. This is a new detection technology developed in recent years. The tilted fiber Bragg grating cut-off mode refractive index sensor is a sensor based on a novel sensing principle. Specifically, when a beam of the probe light is injected into the fiber core, a stable transmission core mode is formed. When the light in the core mode is incident on the tilted grating, the light satisfying the coupling conditions is excited to a series of higher-order cladding modes. This series of higher-order cladding modes propagate in a composite waveguide called "core+cladding". The excited higher-order cladding modes have different effective refractive indices, which are between the refractive indices of the fiber core and the external medium. The cutoff of the cladding mode occurs when the effective refractive index of the cladding mode is equal to the external refractive index. This mode has a very strong evanescent field power occupation and is extremely sensitive to the external refractive index. From the output of the tilted fiber Bragg grating spectrum, the cladding mode appears as a significantly attenuated resonance peak. Since the effective refractive index of the cut-off mode is equal to the real refractive index of the external medium, the effective refractive index corresponding to each cut-off mode can be solved by numerical calculation. Therefore, the real refractive index of the external medium can be calculated by monitoring the position of the cut-off mode.

The measurement of the refractive index by the traditional interferometric fiber refractive index sensor and fiber grating refractive index sensor is mainly based on the relative amount of peak shift. The sensor needs to be calibrated in advance to obtain a standard curve, through which the refractive index of the sample can be measured. However, the refractive index sensor based on the cut-off mode of the tilted fiber Bragg grating does not need to mark the sensor in advance. It can directly measure the real refractive index of the external medium and has the obvious advantages of convenient and quick use, no need for calibration, and high stability. In addition, the slanted fiber grating cut-off mode sensor also provides a reliable method for the analysis of biological and chemical components. Therefore, the tilted fiber Bragg grating cut-off mode sensor has broad application prospects in the above-mentioned fields of biochemical analysis, disease diagnosis, food safety, electrochemical analysis, battery safety monitoring, etc.

However, conventional tilted fiber Bragg grating cut-off mode sensors based on standard communication fibers (125 μm in diameter) can achieve true refractive index measurements. However, the detection accuracy is low, about ±0.001. In this embodiment, we use a novel device of "tilted fiber Bragg grating+transparent capillary" to improve the detection accuracy of the cut-off mode refractive index sensor. By choosing the right size capillary, the detection accuracy can be improved to ±0.0001, an order of magnitude improvement.

A quartz capillary was used as the outer casing. The excitation of higher-order cladding modes inside the "fiber cladding+transparent sleeve" is achieved by tilting the fiber Bragg grating. The excited higher-order cladding modes have different effective refractive indices. The cut-off of the cladding mode occurs when the effective refractive index of the cladding mode is equal to the external refractive index. This mode has an extremely strong evanescent field on the outer surface of the capillary and is extremely sensitive to the external refractive index. Thus, a "tilted fiber Bragg grating+transparent capillary" cut-off mode refractive index sensor is constructed. From the spectral point of view, the resonance peak density of the "fiber cladding+transparent sleeve" device is larger than that of the traditional tilted fiber Bragg grating device. The cut-off mode of the "fiber cladding+transparent sleeve" device has a smaller bandwidth than the cut-off mode of the traditional tilted fiber Bragg grating sensor. Therefore, the "fiber cladding+transparent sleeve" device has a higher wavelength resolution than the traditional tilted fiber Bragg grating device. Higher detection accuracy can be obtained when performing refractive index measurements.

Figure 10:
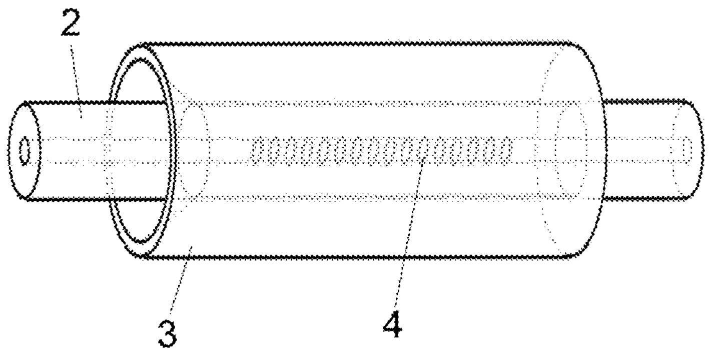
FIG. 10 and FIG. 11 illustrates a perspective view and a cross-sectional view of the fiber-optic sensing apparatus in Example 2 of the disclosure.
Figure 11:
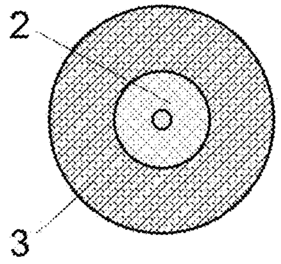

As shown in FIG. 10 and FIG. 11, this embodiment provides an outer sleeve optical fiber sensor. The device includes a transparent capillary 3 and an optical fiber sensor 2. The optical fiber sensor 2 is a single-mode optical fiber, that is, the optical fiber sensor 2 is engraved with a tilted fiber Bragg grating 4. The gap between the optical fiber sensor 2 and the transparent capillary 3 is filled with a refractive index matching liquid with a refractive index of 1.4608. The optical fiber sensor of the outer sleeve can be regarded as a "tilted fiber Bragg grating+transparent capillary" cut-off mode sensor. The structure of the corresponding optical fiber detection system is the same as that of Embodiment 1, and the light in the optical fiber core can be converted into the cladding mode transmitted in the cladding through the tilted fiber Bragg grating. Since the cladding of transparent capillary 3 and the optical fiber is made of the same quartz material, the refractive index matching liquid filled in the gap between the transparent capillary 3 and the optical fiber cladding has the same refractive index as the optical fiber cladding. Therefore, the transparent capillary+refractive index matching liquid+fiber cladding can be regarded as a new cladding with a larger diameter. Therefore, the cladding mode excited by the tilted fiber Bragg grating can be transmitted in the new cladding layer of "transparent capillary+index matching liquid+fiber cladding". When the effective refractive index of the cladding mode is equal to the direct rate of the external medium, there is enhanced evanescent wave spillover to the transparent capillary surface. Therefore, the refractive index and biochemical substances of the outer surface of the transparent capillary can be detected by the plasmon resonance.

In this embodiment, the tilted fiber Bragg grating 4 is written by using an excimer laser and a phase mask. The tilt angle of the tilted fiber Bragg grating 4 is 12 degrees, and the axial length is 10 mm to 20 mm. Light source 1 has a spectrum from 1400 nm to 1620 nm. The spectral range of light source 1 matches the transmission spectral range and the plasmon resonance absorption peak range of the tilted fiber Bragg grating 4.

Figure 12:
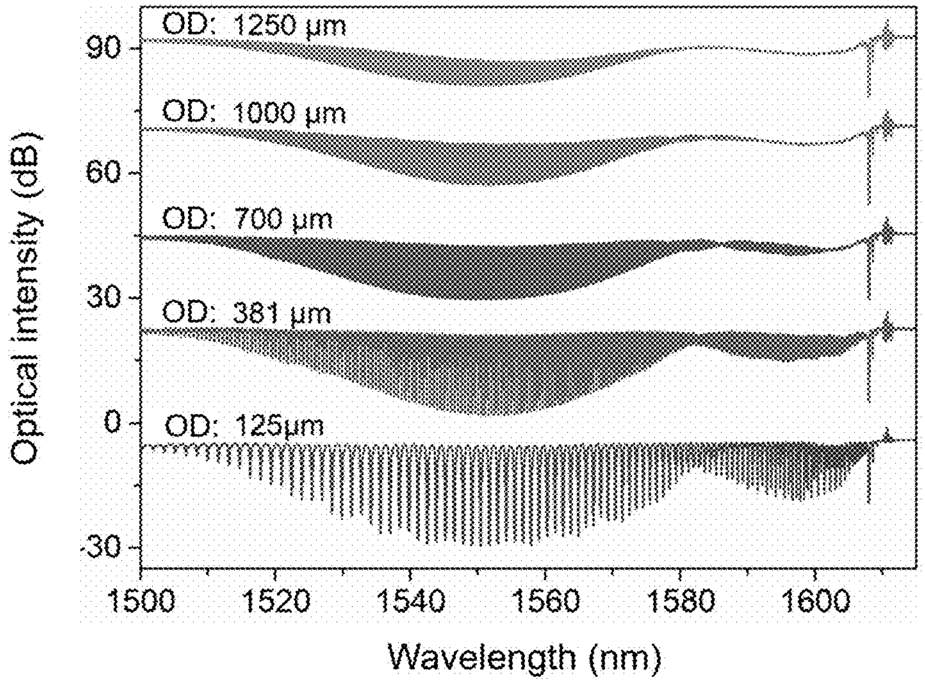
FIG. 12 shows the transmission spectrum of a traditional tilted fiber Bragg grating cut-off mode sensor with an outer diameter of 125 μm and a "tilted fiber Bragg grating+transparent capillary" cut-off mode sensor with outer diameters of 381 μm, 700 μm, 1000 m and 1250 μm in air.
Figure 13:
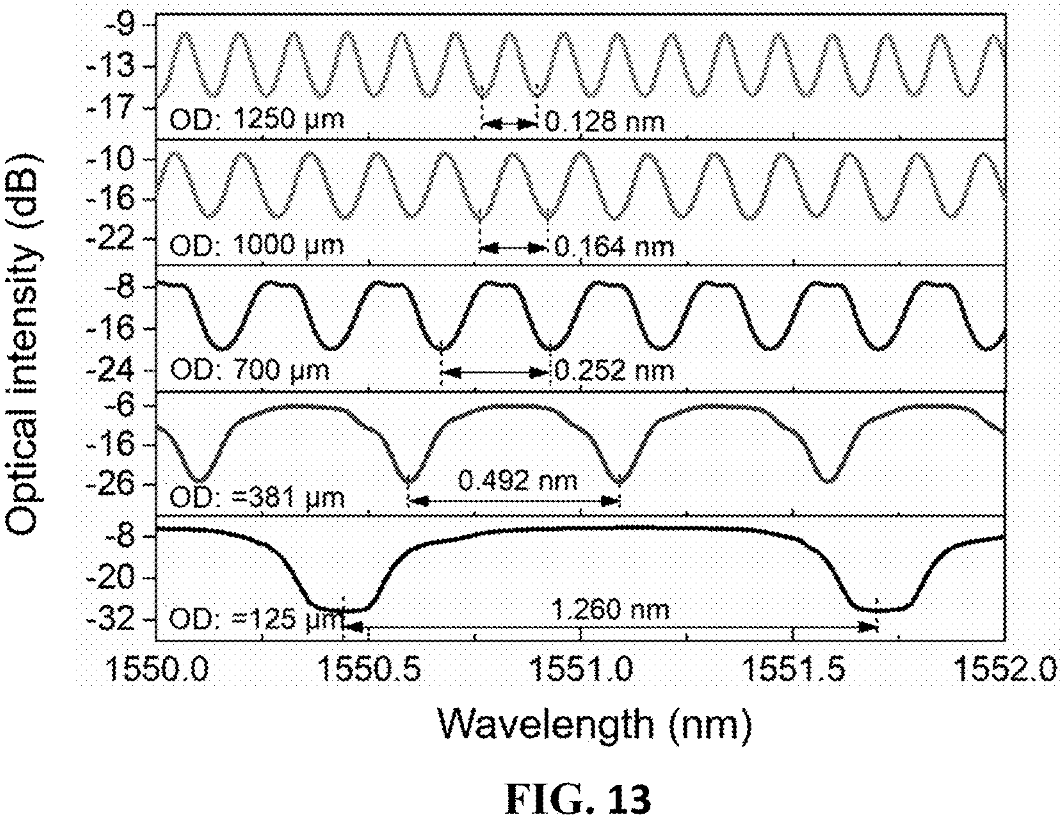
FIG. 13 shows a partial magnification of the spectrum of the traditional tilted fiber Bragg grating cut-off mode sensor with an outer diameter of 125 μm and a "tilted fiber Bragg grating+transparent capillary" cut-off mode sensor with outer diameters of 381 μm, 700 μm, 1000 μm and 1250 μm in air.
Figure 14:
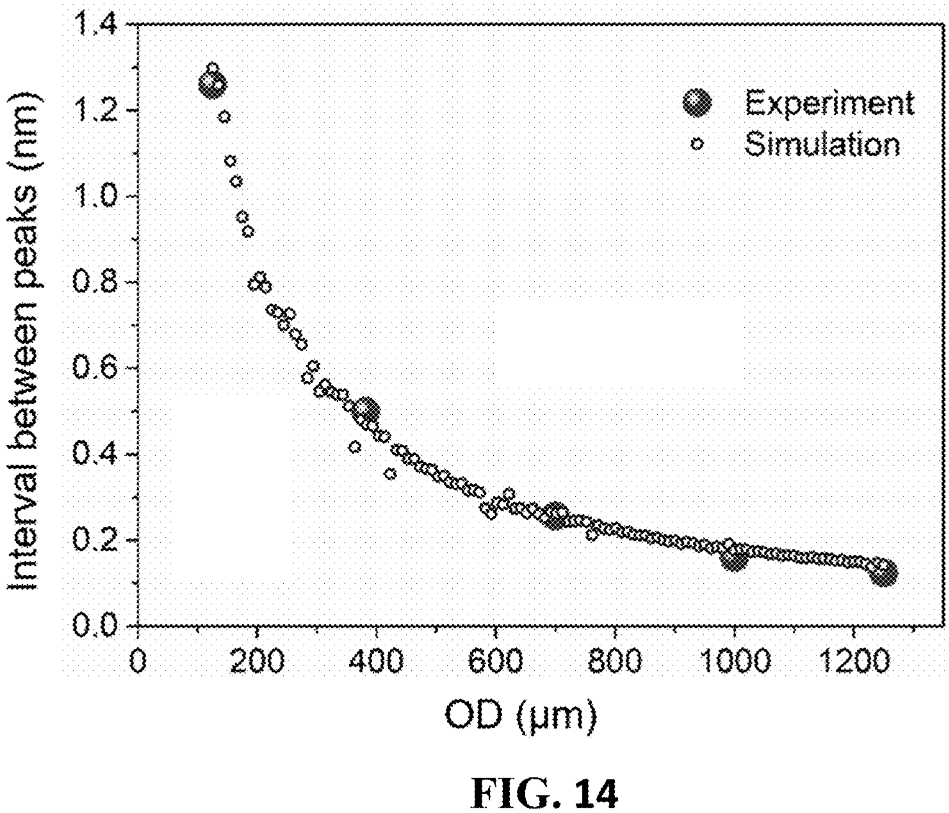
FIG. 14 is a graph showing the relationship between the resonance peak interval and the outer diameter of the cut-off mode sensor of "tilted fiber Bragg grating+transparent capillary".

For liquid refractive index measurements, the outer sleeve fiber optic sensing device is placed in sample solutions with different refractive indices. And connect the optical fiber sensor of the outer sleeve with the optical fiber detection system. Refractive index measurements are achieved by tracking the wavelength positions of cutoff modes in the output spectrum. FIG. 12 shows the transmission spectrum of a traditional tilted fiber Bragg grating cut-off mode sensor with an outer diameter of 125 μm and a "tilted fiber Bragg grating+transparent capillary" cut-off mode sensor with outer diameters of 381 μm, 700 μm, 1000 μm and 1250 μm in air. Comparing the partially enlarged spectrum in FIG. 13, it can be seen that compared with the traditional tilted fiber Bragg grating plasmon resonance sensor with an outer diameter of 125 μm, after adding a transparent capillary, the interval of the resonance peaks in the output spectrum of the sensor decreases with the increase of the outer diameter of the capillary. This law can be well represented in FIG. 14. For the cut-off mode sensor, the reduction of the resonance peak spacing helps to improve the wavelength resolution.

The position of the plasmon resonance absorption peak in the spectrum did not change. Moreover, with the increase in the diameter of the outer capillary, the resonance peaks in the output spectrum of the sensor gradually become thinner and denser. This will allow the resonance peak envelope of the plasmon wave to cover more sampling points than conventional tilted fiber Bragg grating plasmonic sensors with an outer diameter of 125 μm. The wavelength interval of the sampling points is also smaller, which is beneficial to extracting the plasmon resonance absorption peak of the gold film on the sensor surface more accurately. It is helpful to extract the wavelength position of the plasmon resonance peak more accurately. As a result, the detection accuracy of the sensor as a whole is improved.

Figure 15:
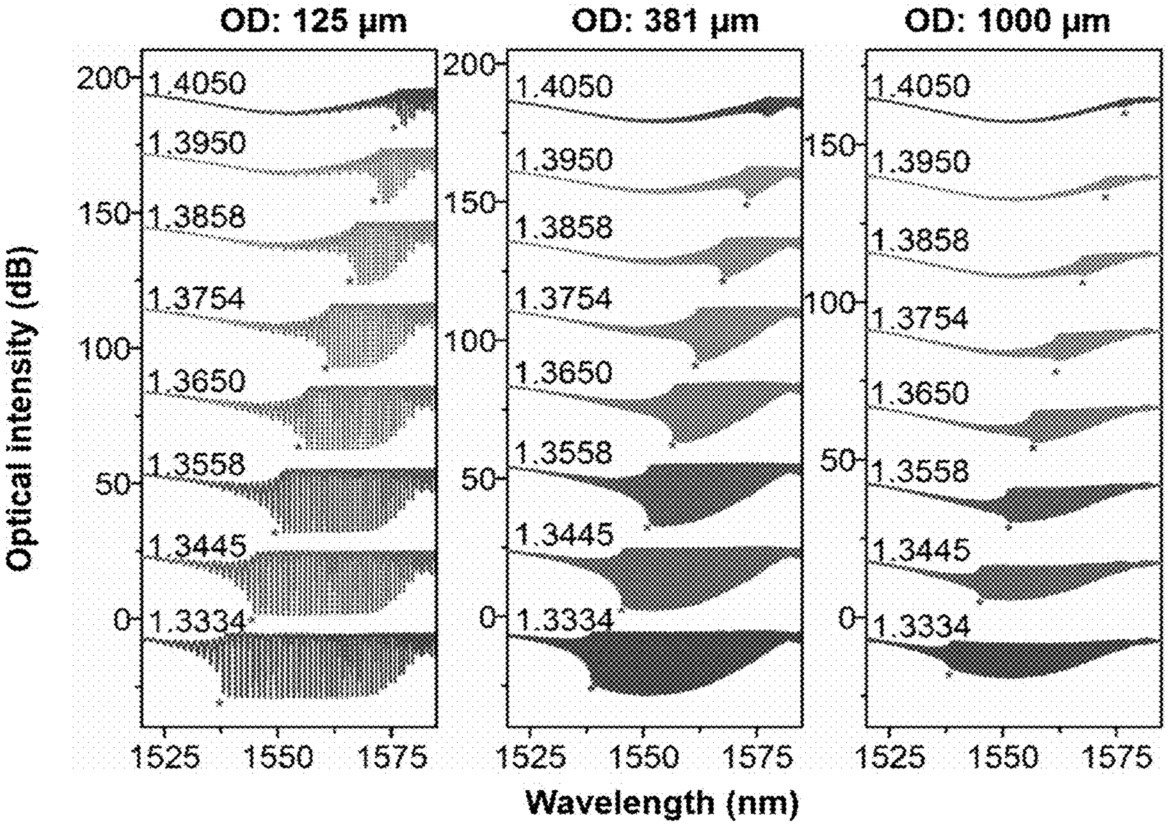
FIG. 15 is a graph showing the change of the spectrum of the traditional tilted fiber Bragg grating sensor with an outer diameter of 125 μm and the "Tilted fiber Bragg grating+transparent capillary" cut-off mode sensor (with outer diameters of 381 μm and 1000 μm) with the external refractive index.
Figure 16:
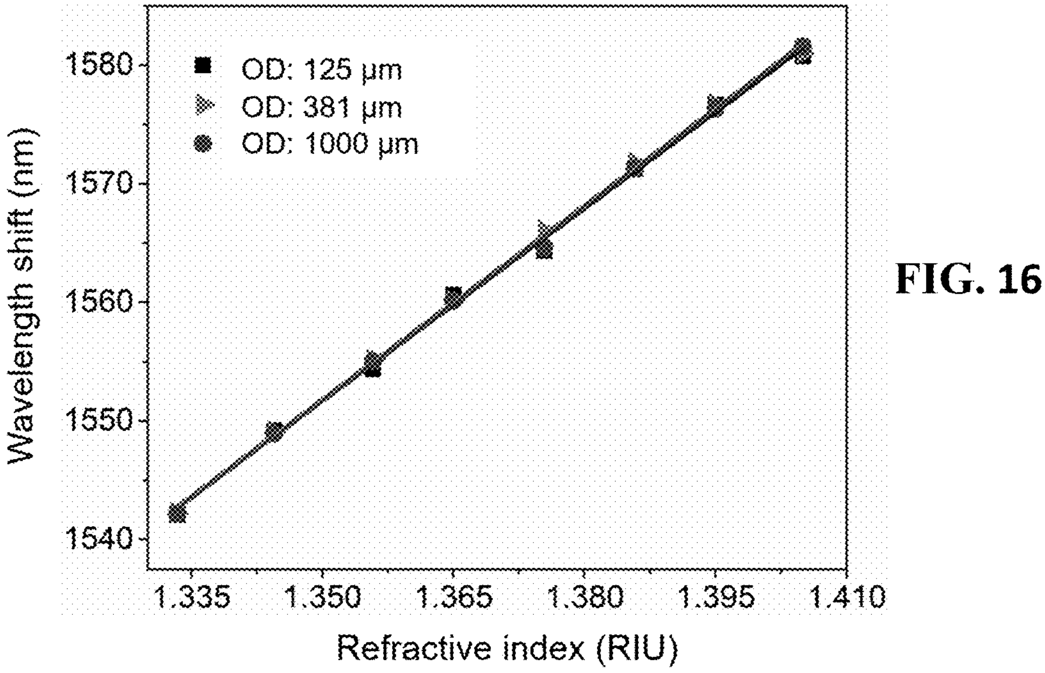
FIG. 16 shows the change of cut-off mode wavelength with the external refractive index of the traditional tilted fiber Bragg grating sensor with an outer diameter of 125 μm and the cut-off mode sensor of "tilted fiber Bragg grating+transparent capillary" (with outer diameters of 381 μm and 1000 μm).
Figure 17:
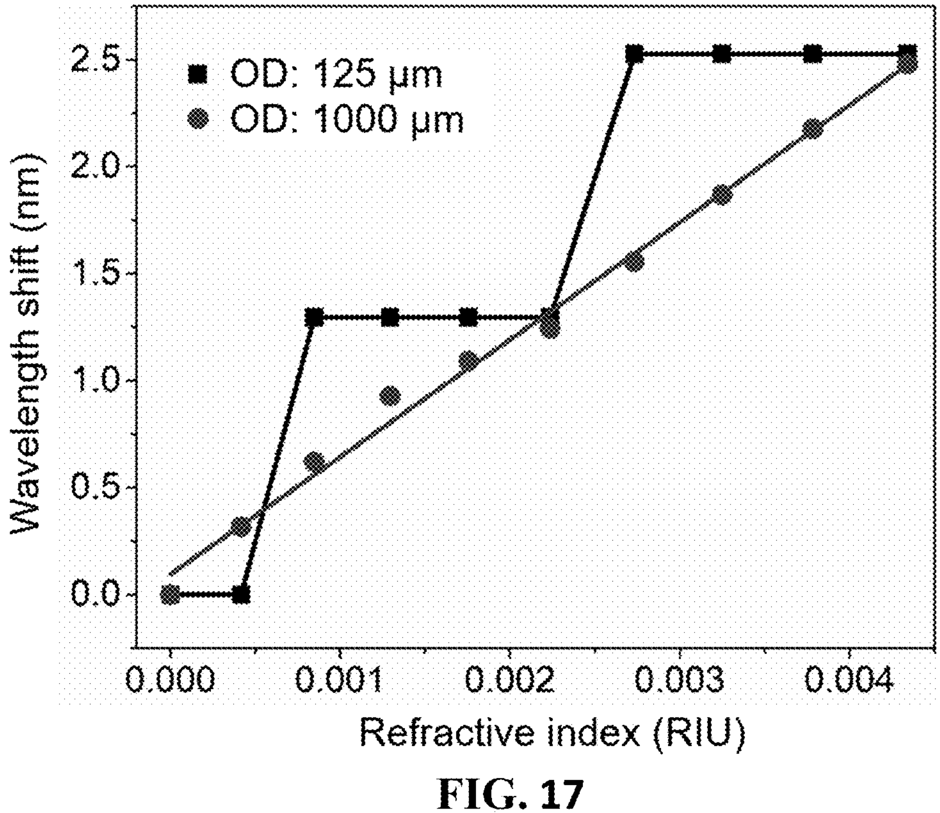
FIG. 17 shows the change of the cut-off mode wavelength in the small refractive index range of the conventional tilted FBG sensor with an outer diameter of 125 μm and the "tilted fiber Bragg grating+transparent capillary" cut-off mode sensor (outer diameter of 381 μm and 1000 μm).

FIG. 15 is a graph showing the change of the spectrum of the traditional tilted fiber Bragg grating sensor with an outer diameter of 125 μm and the "tilted fiber Bragg grating+transparent capillary" cut-off mode sensor (with outer diameters of 381 μm and 1000 μm) with the external refractive index. The change in the outer diameter of the transparent capillary does not change the position of the cut-off mode under different external refractive indices. Both the conventional tilted FBG cut-off mode sensor with an outer diameter of 125 μm and the "tilted fiber Bragg grating+transparent capillary" cut-off mode sensor with outer diameters of 381 μm and 1000 μm exhibited the same refractive index sensitivity. FIG. 16 shows the corresponding test results. However, since the larger-diameter "tilted fiber Bragg grating+transparent capillary" cut-off mode sensor has a smaller interval of resonance peaks, it is easier to obtain higher detection accuracy with small refractive index changes. To demonstrate this, we used a conventional tilted fiber Bragg grating cutoff mode sensor with an outer diameter of 125 μm and a "tilted fiber Bragg grating+transparent capillary" cut-off mode sensor with an outer diameter of 1000 μm to measure a series of refractive indices with a small refractive index difference. solutions were tested. The results are shown in FIG. 17. When the refractive index is less than 0.0015, the conventional tilted fiber Bragg grating cut-off mode sensor with an outer diameter of 125 μm cannot detect the difference. The detection accuracy is about ±0.001 mainly because the resolution of the sensor is limited by the resonant peak spacing of the output spectrum. The "tilted fiber Bragg grating+transparent capillary" cut-off mode sensor with an outer diameter of 1000 μm can well distinguish the difference in the external refractive index of 0.0005. The detection accuracy of about ±0.0001 is greatly improved by an order of magnitude. Therefore, the technique of this embodiment can obtain a lower detection limit in practical application. It is suitable for the detection of trace biochemical substances.

To sum up, the optical fiber sensor with the outer sleeve ("tilted fiber Bragg grating+transparent capillary" cut-off mode sensor) in this embodiment has many advantages over the traditional tilted fiber Bragg grating plasmon resonance sensor, as follows:

1) The interface for biochemical detection can be transferred from the fiber surface to the transparent capillary surface. Corresponding biological and chemical modifications are carried out on the surface of the transparent capillary, transforming the tilted fiber grating from a consumable to a permanent optical device. The transparent capillary as a consumable has the same manufacturing precision as the optical fiber. The manufacturing cost of the capillary is much lower than that of the tilted fiber grating device, which greatly reduces the cost of use.

2). Using the tilted fiber grating as a permanent optical device makes the connection between the fiber sensor, the light source, and the photodetector also a permanent link. It solves the problem of convenient, stable, and efficient coupling between the traditional optical fiber biochemical sensor and the light source and the photodetector during the use of the traditional fiber optic sensor as a consumable.

3). The transparent capillary makes the resonance peaks in the output spectrum of the sensor gradually thinner and denser. It is beneficial to extract the wavelength position of the cut-off mode in the output spectrum of the sensor more accurately, and improve the wavelength resolution. The addition of the transparent capillary did not affect the sensitivity of the sensor. Therefore, as a whole, the detection accuracy of the sensor is improved by nearly an order of magnitude.

4). The transparent quartz capillary is used as the external sensitive interface, and the transparent quartz capillary is resistant to high temperatures. Therefore, the present embodiment solves the problem that the conventional devices that are not resistant to high temperatures cannot perform the high-temperature surface treatment.

The refractive index sensing performed in this embodiment is only the simplest application. The "tilted fiber Bragg grating+transparent capillary" cut-off mode sensor can also be used in the detection of biomolecules, the analysis of chemical components, and the detection of electrochemical reaction processes.

Example 3

In this example, one embodiment of the fiber-optic sensing apparatus that substantially utilizes a tilted fiber Bragg grating (TFBG) as the optical fiber sensor, as well as a fiber-optic sensing system using the fiber-optic sensing apparatus, is provided. In this example, such a fiber-optic sensing apparatus is termed as "hybrid TFBG-capillary device" or alike, with a bare TFBG inscribed in the core of a single-mode optical fiber (SMF, i.e. "optical fiber sensor") inside a bare silica capillary (i.e. "outer sleeve") and filling the air gaps with refractive index (RI) matching oil (i.e. "filling medium").

1. INTRODUCTION

Optical fiber sensor research and commercial development have experienced significant growth over the past 40 years. Particularly, fiber Bragg gratings have become a well-explored and widely accepted tool for various environmental applications due to their salient advantages of high sensitivity, compact size, mechanical robustness, batch fabrication, and superior multiplexing capability.

In recent years, tilted fiber Bragg grating (TFBG), typically obtained by inscribing tilted gratings in the core of a standard single-mode optical fibers (SMF), is emerging as a new type of fiber-optic sensor, which possesses the merits of the fiber Bragg gratings and adds the capability to excite multiple cladding modes resonantly (Albert et al. 2013 and Guo et al. 2016). Due to the advantageous capability to capture both the core and cladding modes, TFBG device not only can realize single-point sensing of physical parameters like temperature, strain (Chen et al. 2006), bending (Shao et al. 2010 and Kisala et al. 2016), and twist angle (Kisala et al. 2016 and Wang et al. 2021), but it also has proven an excellent tool for true refractive index sensing (Zhou et al. 2017), magnetic field sensing (Zhang et al. 2016), biochemical analysis (Loyez et al. 2018; Liu F et al. 2013; Liu F et al. 2021; and Liu L H et al. 2021), metal ions detection (WO2020238830A1), gas sensing (Cai et al. 2020 and Caucheteur et al. 2013; U.S. Ser. No. 10/718,711B1; U.S. Ser. No. 10/845,303B2), and battery and supercapacitor monitoring (Huang et al. 2021 and Lao et al. 2018; U.S. Ser. No. 20210025945A1 and WO2022037589A1).

Since the invention of the TFBG, most of the efforts have been focused on exploring the parameters of the tilted gratings, the manufacturing techniques, the signal demodulation 19, and possible applications. Almost all the TFBGs are inscribed in standard single-mode optical fibers (SMF). However, the optical fiber itself, as the carrier of the TFBG, is seldomly studied. In fact, the propagation property of the core mode and the cladding modes are strongly affected by the geometry and optical parameters of the optical fiber. Thus, the optical spectrum and properties of the TFBG can be tuned by varying the parameters of optical fiber. Several studies have demonstrated that the optical spectrum and sensing performance of a TFBG can be tuned by thinning the fiber cladding (Bai et al. 2021 and Sypabekova et al. 2019), thus opening new opportunities for the TFBG sensing device.

In this work, however, the opposite is proposed, i.e., to artificially enlarge the cladding diameter (still from a standard SMF) and a new hybrid TFBG-capillary sensing device that shows improved sensing performance over the bare SMF TFBG is demonstrated. The sensing device is realized by inserting a bare TFBG inscribed in SMF inside a silica capillary and filling the air gaps with refractive index (RI) matching oil. In this way, the fiber cladding and the silica capillary, whose refractive indices are identical, work as a new thick cladding, and the whole device can be regarded as TFBG with an enlarged cladding. This study reveals that the free spectral range (FSR) of the cladding modes fringes in the spectrum tends to shrink as the outer diameter (OD) of the whole device increases. This leads to an increased number of cladding modes and a denser spectrum compared to the bare TFBG. This hybrid sensing device also exhibits distinct cut-off points and shows similar RI sensitivity compared to bare TFBGs. With an outer cladding of 1000 μm, the detection accuracy can be improved by nearly one order of magnitude. This new sensor scheme can improve the sensing performance and reduce the cost for each sensor, and most importantly, the outer capillary can work as a sacrificial layer to endure harsh processing such as high-temp coating depositions and chemical etchings.

2 STRUCTURE AND CHARACTERIZATION

Figure 18A:
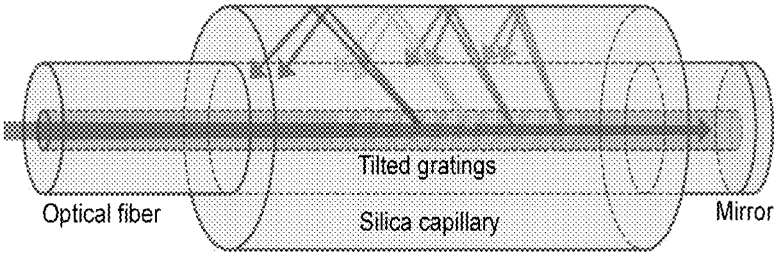
FIG. 18A and FIG. 18B respectively illustrates a perspective view and a cross-section view of the schematic diagram of the hybrid TFBG-capillary device in Example 3 of the disclosure.
Figure 18B:
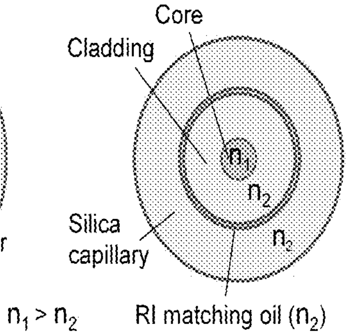

The configuration of the proposed hybrid TFBG-capillary device is shown in FIG. 18A and FIG. 18B, where a TFBG written in a SMF with an OD of 125 μm is inserted into a silica capillary whose inner diameter (ID) is about 126 μm, slightly larger than the OD of the optical fiber. The thin gap between the optical fiber and the capillary is filled with refractive index-matching oil (Cargille Labs, USA, Series A A, refractive index: 1.4560±0.0002) whose RI at wavelengths near 1550 nm is close to that of pure silica (1.444). Thus, the silica capillary, the refractive index-matching oil, and the optical fiber cladding tend to show the same RI. In this way, the whole device can be regarded as a new optical fiber device with an 8.2-μm fiber core and a thick cladding and a TFBG written in the fiber core. In a conventional TFBG, when a beam of broadband light propagates in the fundamental mode of the core encounters the tilted grating, a large number of cladding modes can be exited. Here, in the hybrid TFGB-capillary device, more cladding modes that reside in the optical fiber-RI matching oil-capillary structure to be excited are expected because of the larger effective V-number of the cladding. Also, the evanescent wave of the extended cladding modes now extends outside the outer surface of the capillary and can be utilized for sensing applications.

Experimental Demonstration and Analysis

The hybrid TFBG-capillary device is fabricated by inserting a bare TFBG probe inside the inner hole of the silica capillary, which is pre-filled with RI matching oil. Pure silica capillaries with an ID of ~126 μm and ODs of 381 μm, 700 μm, and 1000 μm are commercially available. Since the OD of the TFBG is only slightly smaller than the ID of the capillary, it is not easy to insert the TFBG into the hole of the capillary. So, the capillary is fixed on a stationary stage and mounted the TFBG on a 3-axial translations stage to provide high accuracy manipulation of the TFBG. The whole process was observed by two sets of long working distance microscopes in real-time from two perpendicular directions. The capillaries were infiltrated with RI matching oil by the capillary force prior to the insertion of the TFBG probe. The RI matching oil that possesses the same RI with the fiber cladding and the silica capillary cannot only bridge the nanogap between the fiber cladding and capillary to allow the light to transmit from fiber cladding into the capillary, but it also can act as a lubricant to facilitate the insertion of the TFBG probe.

Figure 19A:
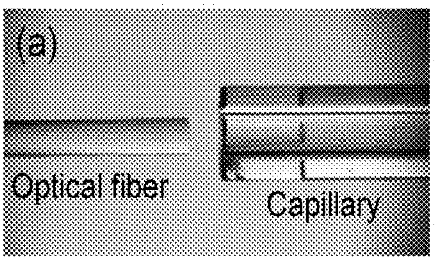
FIGS. 19A-19C illustrate the assembly of the hybrid TFBG-capillary device, with FIG. 19A showing the micrograph of a TFBG probe and a capillary which are separated by a distance and well-aligned in priority to the insertion, FIG. 19B showing the micrograph of the pair of TFBG probe and capillary after the insertion, and FIG. 19C showing the cross-section views of hybrid TFBG-capillary devices with OD of 381 μm, 700 μm, and 1000 μm, respectively.
Figure 19B:
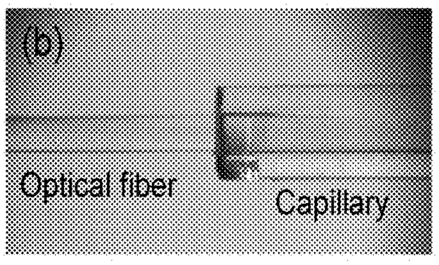
Figure 19C:
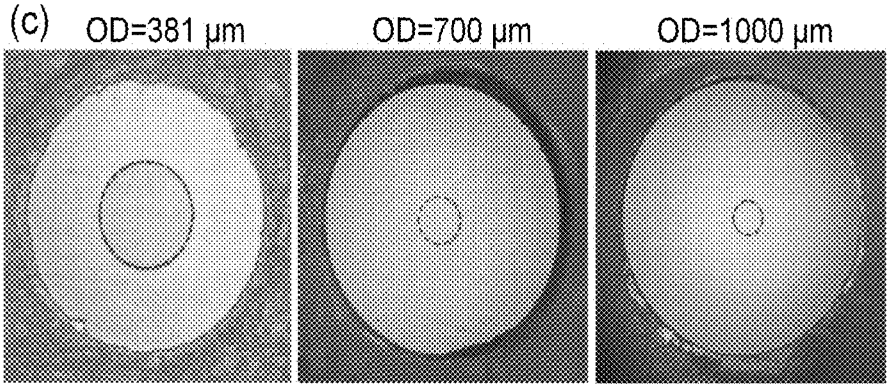

A typical microscope image of a TFBG probe and a capillary that are still separated and well-aligned is shown in FIG. 19A. The same pair of TFBG probe and capillary after insertion is shown in FIG. 19B. Then the TFBG-capillary hybrid device is transferred into the microfluidic cell of an acrylic sensor chip and fixed. In this study, hybrid TFBG-capillary devices with different ODs are fabricated using the same method. The micrographs depicting the cross-sections of these devices are displayed in FIG. 19C. The red circles mark the outer profile of the optical fiber, whose diameter is 125 μm.

The experimental setup for measuring the spectrum of the hybrid TFBG-capillary devices and for refractive index sensing is shown in FIG. 20, which substantially illustrates a fiber-optic sensing system. A broadband source (BBS) with a 1500-1620 nm spectrum range was used to provide an unpolarized input light. The polarization state of the incident light was precisely controlled by a polarizer and a polarization controller (PC). The incident light was launched into the hybrid TFBG-capillary device via a circulator, and the reflected light was guided to the OSA (Yokogawa, AQ6370C) through the circulator. Thus, the reflection spectrum was captured and recorded by the OSA with a spectral resolution of 0.015 nm. A gold mirror deposited at the cleaved end of the fiber is used to reflect the transmitted light so that the TFBG transmission spectrum can be measured in reflection (facilitating the use of the device as a true "point sensor").

Spectral Characteristics

Firstly, the property of the optical spectrum of the hybrid TFGB-capillary device was investigated. In this study, a TFBG with a tilt angle of 12° C. was used. Silica capillaries with an ID of ~126 μm and ODs of 381 μm, 700 μm, and 1000 μm were tested in this study.

The measured reflection spectra of the hybrid TFBG-capillary device with different ODs are shown in FIG. 21A. The spectrum of bare TFBG was also placed in the figure for comparison. All the TFBG-capillary devices and the bare TFBG were placed free-standing in air during the measurement. For a bare TFBG, the resonant fringes of the cladding modes can be distinguished from each other. However, for a TFBG-capillary device with an OD of 381 μm, the number of the resonant fringes increases dramatically compared with the bare TFBG, and the depth of the fringes also shows a reduction while the shape of the lower envelope stays nearly unchanged. When the OD of the device increases to 700 μm and further to 1000 μm, the number of the resonant fringes undergoes further increases, and the depth of the fringes continues to shrink while the shape of the lower envelopes stays nearly unchanged. To show the details of the spectra more clearly, the magnified spectra was displayed in the wavelength range of 1550~1552 nm in FIG. 21B. It is clear that as the OD of the device increases, the fringes' density also increases, and the FSR and the depth of the fringes all go down. It is also noted that the core mode resonance of the TFBG near 1610 nm remains unchanged as the OD of the hybrid TFBG-capillary device increases since the core mode fields do not extend further than a few microns away from the core diameter and do not perceive the cladding diameter change.

These experimental findings were verified by simulations of the transmission spectrum of the hybrid TFBG-capillary device. This was carried out by first calculating the vector mode fields and effective index of cladding modes as a function of cladding diameter ranging from 125 μm to 1000 μm and of wavelength with a cylindrical finite-difference mode solver. Then the corresponding spectra (for P- or S-polarized input core guided light) were calculated with the complex coupled-mode theory based on a Runge-Kutta algorithm 9. The fiber properties used were as follows: core radius=4.1 μm, cladding material of pure silica (SiO2), and core material of germanium-doped silica with 0.0625 germanium/silicon ratio. The evolution of the spectrum with increasing cladding diameter is shown in FIG. 21C (limited to a wavelength range of 1551~1556 nm because these simulations are very time-consuming). The FSR and the depth of the fringes diminish as the OD of the device increases, which is consistent with the experimental results. The FSR of the experimental results and the simulation results was plotted as a function of the OD in FIG. 21D demonstrating that the experimental results agree well with the simulation results. With these results, the value of the OD for any desired FSR can be obtained.

RI Sensing Performance

The cut-off point of the TFBG is a unique feature that can be utilized for sensing applications. Theoretically, the cut-off point satisfies the criteria that the effective RI (ERI) of a specific cladding mode equals the surrounding RI (SRI). Since the TFBG supports numerous cladding modes with diverse ERIs, the cut-off point can serve as an indicator to quantify the SRI. Such a refractometer is superior to the other fiber-optic or prism refractometers in that it measures the true value of the RI, as the ERI of the cut-off point is always equal to the SRI (Zhou et al. 2015). However, one limitation of this sensing strategy is that the resonance wavelengths of the cladding modes are a series of discrete points, and the sensor is "blind" between the mode resonances, thus reducing the detection accuracy.

According to the results in the previous section, the hybrid TFBG-capillary device supports many more cladding modes than the bare TFBG with a diameter of 125 μm and a much denser spectrum of mode resonances. In this respect, the hybrid TFBG-capillary device should provide a solution to the long-standing SRI discretization problem.

Then, the RI sensing performance of the proposed sensor was evaluated. Two hybrid TFBG-capillary devices with ODs of 381 μm and 1000 μm were studied, and a bare TFBG with an OD of 125 μm was also tested for comparison. The spectral responses of the three devices was first studied by testing liquids with RIs ranging from 1.3334 to 1.4050 (measured by a digital refractometer at the wavelength of 589.3 nm) with large intervals. The purpose of the study is to explore the RI sensitivity of the hybrid TFBG-capillary devices. The recorded spectra of the two hybrid TFBG-capillary devices and the bare TFBG are displayed in FIG. 22A. The two hybrid TFBG-capillary devices show a similar tendency as the bare TFBG as the SRI increases, which makes sense since the cut-off mode wavelength is at the same distance from the Bragg wavelength in all cases. As expected, the cut-off points tend to redshift as the SRI increases. The positions of the cut-off points was extracted for all three devices and plotted them as a function of SRI in FIG. 22B. It is clear that the hybrid TFBG-capillary devices with different ODs exhibit the same sensitivity in the RI range of 1.3334 to 1.4050. And all three devices show high linearity. With these results, it can be concluded that the behavior of the cut-off mode is independent of the OD of the TFBG. In fact, this can be explained by the phase-matching equation, $$\lambda_{cl} = \left[n_{eff}^{co}(\lambda_{cl}) + n_{eff}^{cl}(\lambda_{cl})\right]\Lambda \tag{1}$$

where $\lambda_{cl}$ and $\Lambda$ are the wavelength of the cladding mode and the projection of the grating period along the fiber axis, respectively.

$$n_{eff}^{co}(\lambda_{cl}) \text{ and } n_{eff}^{cl}(\lambda_{cl})$$

are the ERIs of the core mode and the cladding mode at the wavelengths of $\lambda_{cl}$. For the cut-off cladding mode, the cut-off wavelength) $\lambda_{cut\text{-}off}=\lambda_{cl}$ and the SRI $$n_{sr}(\lambda_{cl}) = n_{eff}^{cl}(\lambda_{cl}).$$

By substituting these two equations into equation 1, it can get, $$\lambda_{cut-off} = \left[n_{eff}^{co}(\lambda_{cl}) + n_{sr}(\lambda_{cl})\right]\Lambda \tag{2}$$

Since both the ERI of the core mode $$n_{eff}^{co}(\lambda_{cl})$$

and the RI of the surrounding filling medium $n_{sr}(\lambda_{cl})$ are independent of the OD of the cladding. It is reasonable that the position of the cut-off point is independent of the OD of the capillary.

Figure 23A:
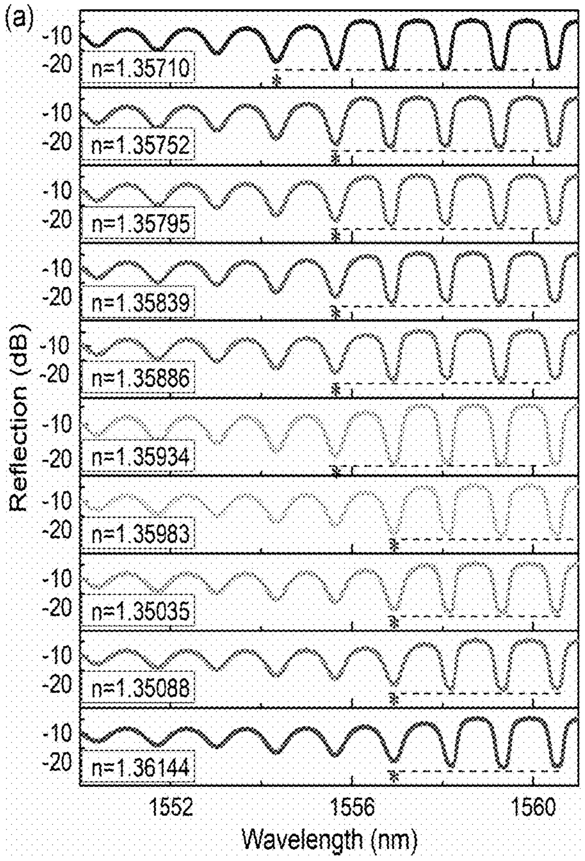
FIGS. 23A-23D shows the sensing performance for small RI variation discrimination, with FIG. 23A showing the spectrum changes of the bare TFBG as the RI increase from 1.35710 to 1.36144 with small increments, FIG. 23B showing the spectrum changes of the hybrid TFBG-capillary device as the RI increase from 1.35710 to 1.36144 with small increments, FIG. 23C showing the position of the cut-off point versus the RI for the bare TFBG sensor, and FIG. 23D showing the position of the cut-off point versus the RI for the hybrid TFBG-capillary sensor.
Figure 23B:
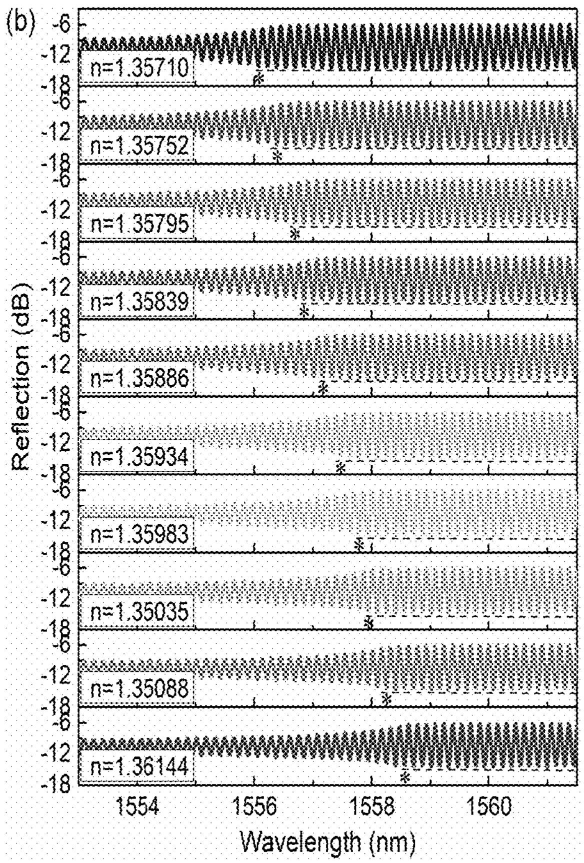
Figure 23C:
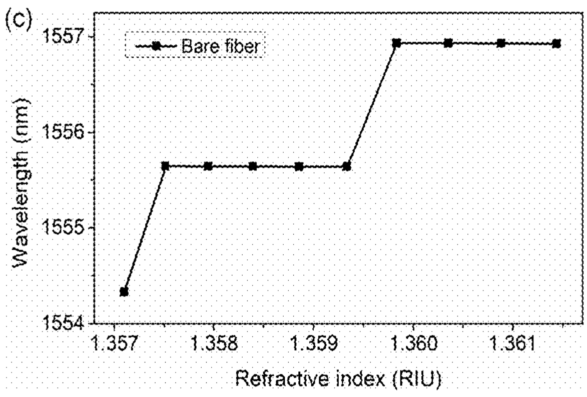
Figure 23D:
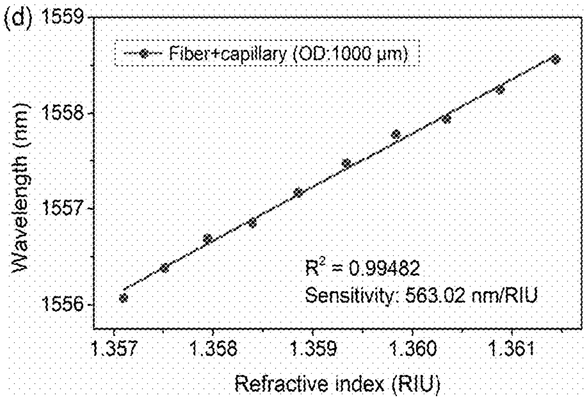
Figure 28A:
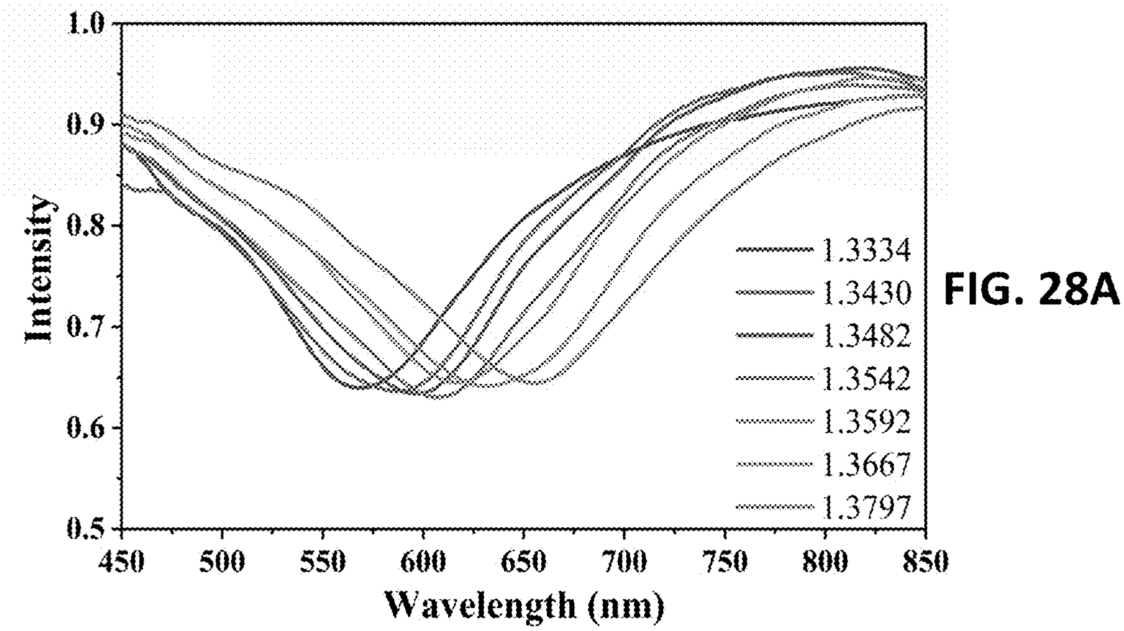
FIG. 28A and FIG. 28B show the response of reflection spectrum of the multi-channel fiber optic SPR sensor under stationary single channel state, with FIG. 28A showing the SPR spectrum response to different solution refractive index, and FIG. 28B showing the relation between the resonance wavelength and the refractive index, where the fit goodness coefficient is $R^2$=99.8%.
Figure 28B:
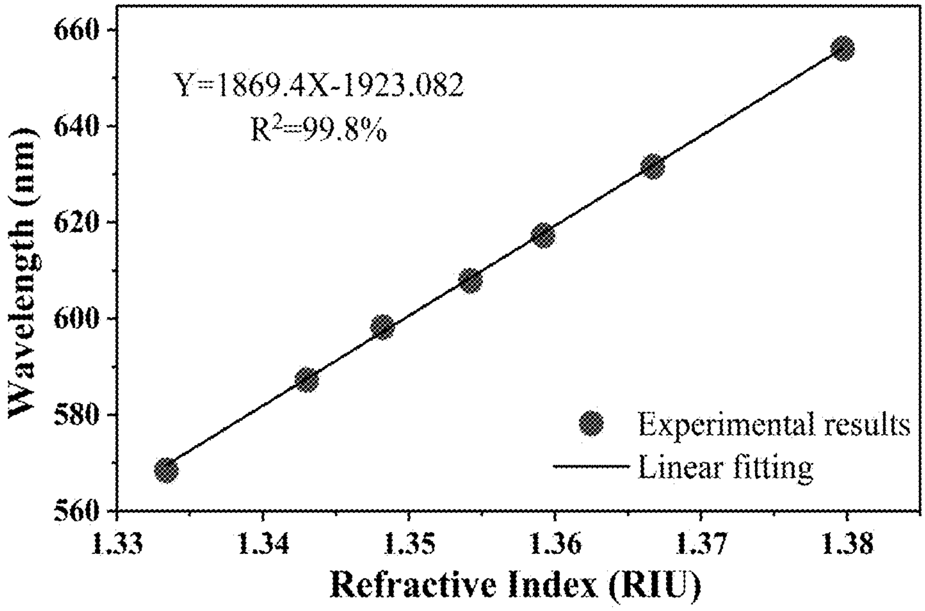

So how is the detection accuracy increased if the sensitivity is the same and the resonances slightly less strong with the hybrid TFBG-capillary device? The key lies in the smaller spacing of the resonances. The performance of the hybrid TFBG-capillary device with an OD of 1000 μm along with that of a bare TFBG was investigated in order to compare their SRI measurement accuracy. A series of liquid samples with RIs ranging from 1.35710 to 1.36144 with small increments was used. The spectral responses of the bare TFBG and the hybrid TFBG-capillary device are displayed in FIG. 23A and FIG. 23B, respectively. It can be observed that when the increments of the SRI are as small as ~0.0005, the bare TFBG fails to distinguish between samples with SRI change lower than about $2\times10^{-3}$. The cut-off point shows a step-like behavior during SRI increases with small increments, as shown in FIG. 23C. This phenomenon is consistent with previous research (Zhou et al. 2015). Actually, the bare TFBG can only detect the SRI with a detection accuracy of 0.002 due to the wide spacing between adjacent cladding modes in the spectrum. However, for the hybrid TFBG-capillary device with an OD of 1000 μm, the spacing is about 0.164 nm. It can discriminate the RIs of these liquid samples with a high resolution and good linearity, as shown in FIG. 23B and FIG. 23D.

Figure 22B:
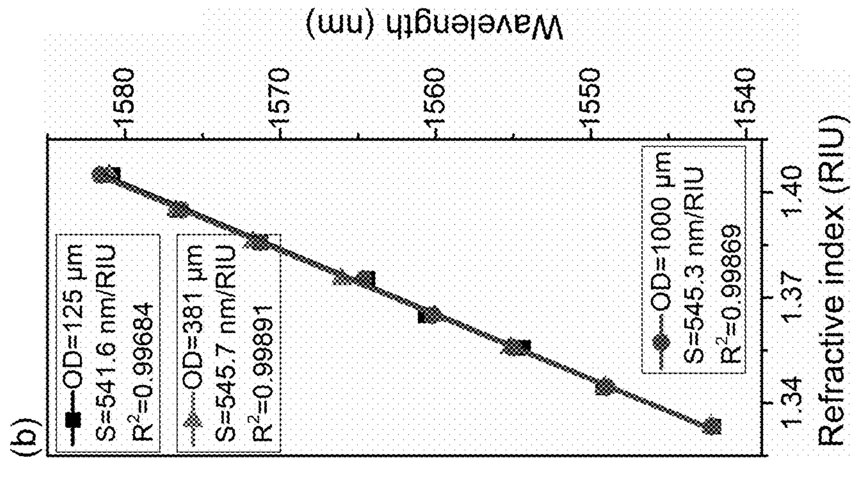
FIG. 22A and FIG. 22B show the RI sensing performance of the hybrid TFBG-capillary device and a bare TFBG, with FIG. 22A showing the spectral responses of the hybrid TFBG-capillary devices and a bare TFBG to SRI, and FIG. 22B showing the position of the cut-off point (marked by a red star) versus the surrounding refractive index.
Figure 22A:
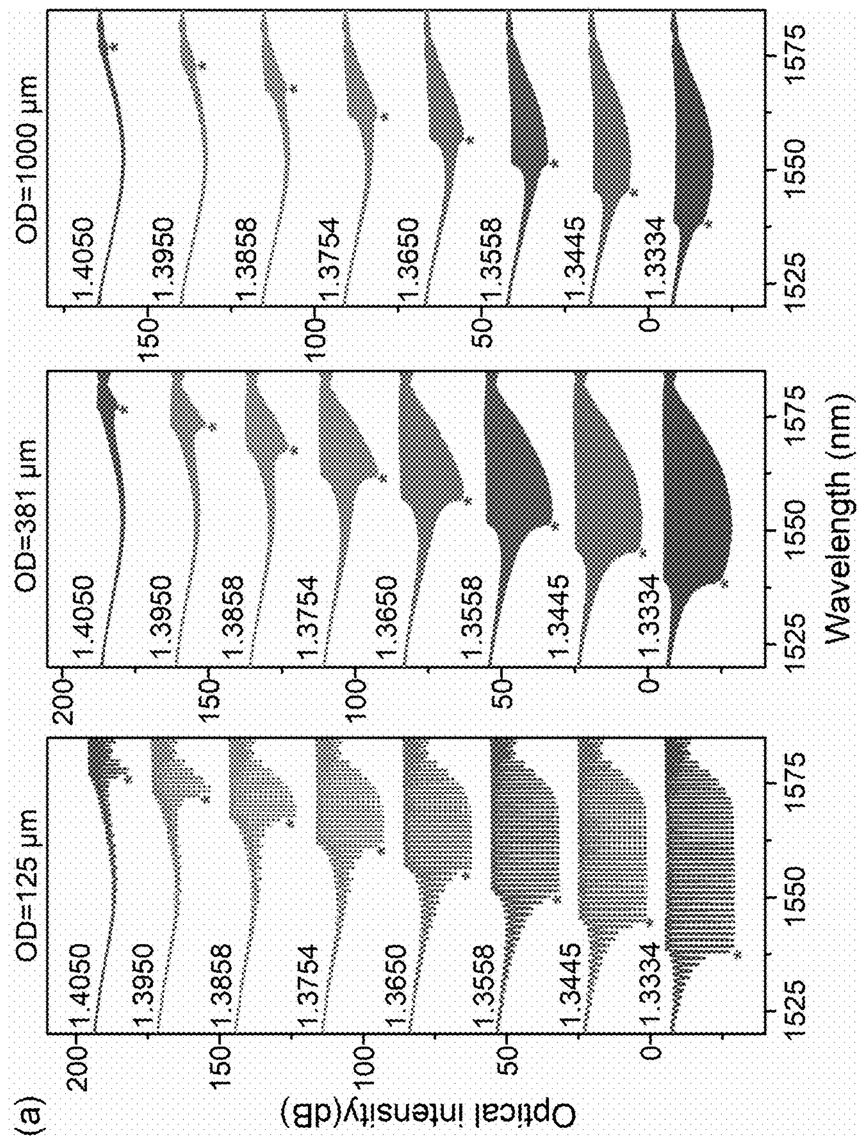

It should be noted that here only the RI range of 1.35710 to 1.36144 was chosen for the demonstration. In fact, the hybrid TFBG-capillary device can be used in the whole range of 1.333-1.40, as seen in FIG. 22A and FIG. 22B. The resolution can be further improved if it can be kept on increasing the device's OD. However, the resolution cannot be improved endlessly. This is because the depth of the cladding mode's fringe also diminishes when the OD gets large, making the cut-off mode more difficult. Thus, a compromise should be made between the resolution and signal-to-noise ratio.

Compared with conventional TFBG sensors, the hybrid TFBG-capillary device thus provides a much denser comb-like spectrum, which leads to an improved spectral resolution for the cut-off cladding mode and provides a replaceable sacrificial interface for cladding mode and provides a replaceable sacrificial interface for surface chemical functionalization and biochemical analysis. For example, some functional two-dimensional material sensing layers (routinely deposited on a substrate via plasma-enhanced chemical vapor deposition (PECVD) under high temperatures of 200~1000° C.) cannot be applied directly to bare TFBG sensors can be realized on the outer surface of silica capillaries, as long as this deposition is carried out prior to inserting the TFBG and matching oil.

3 CONCLUSION

In summary, a hybrid TFBG-capillary sensing device is proposed and demonstrated. The spectral characteristics and the sensing performance was systematically studied using the cut-off cladding modes. This research shows that, with the capillary, the spectrum of the TFBG tends to become dense as the large cladding outer diameter supports more cladding modes. Both the spacing between two adjacent fringes and the fringe depth tend to decrease as the OD of the capillary increases. With such an enlarged OD, the hybrid TFBG-capillary device shows improved spectral resolution using the cut-off mode for RI sensing. The hybrid sensing device is promising for high-performance biochemical analysis. This proposed sensing scheme is flexible in configuration and offers new material options and sensing strategies for developing novel fiber sensing devices.

Example 4

In this example, another embodiment of the fiber-optic sensing apparatus that substantially utilizes a heterocore optical fiber probe as the optical fiber sensor, as well as a fiber-optic sensing system using the fiber-optic sensing apparatus, is provided. In this example, such a fiber-optic sensing apparatus is termed as "heterocore optical fiber and gold-plated quartz tube" or alike, with a heterocore optical fiber probe (i.e. "optical fiber sensor") inserted inside a gold-plated or gold-coated silica capillary or quartz capillary (i.e. "outer sleeve") and filling the gaps with a refractive index (RI) matching oil (i.e. "filling medium"). Herein, the heterocore optical fiber comprises a multimode fiber fused or spliced with a single-mode fiber, configured such that an incident light is transmitted in a direction from the multimode fiber to the single-mode fiber.

With the rapid development of optical fiber surface plasmon resonance research, the demand for real-time detection of high information in the optical fiber SPR sensing industry will continue to increase. Therefore, optical fiber SPR sensing requires detection methods with more sensing channels. At present, optical fiber SPR sensors play an important role in biological detection (Guo et al. 2016; Yanase et al. 2010; Wang et al. 2017; Singh 2016), environmental detection (Si et al. 2019; Zhang et al. 2020; Tabassum et al. 2015; Boruah et al. 2018; Prakashan et al. 2020), food safety detection (Ravindran et al. 2021; Homola et al. 2004), gas detection (Semwal et al. 2021; Tokiska et al. 2001; Liu et al. 2018), and other fields. However, non-specific binding, changes in temperature and concentration in the environment, and changes in non-target intermolecular reactions will all cause changes in the refractive index in the detection environment, and these additional changes will greatly affect the actual detection efficiency. and detection accuracy. Therefore, it is very important to develop a multi-channel optical fiber SPR sensor that can realize real-time and accurate detection of the target.

At present, fiber SPR devices are mostly used for the detection of single parameters. With the increasing requirements for high-sensitivity and multi-analyte detection in biological, environmental, and food detection, multi-channel fiber-optic SPR sensors have received more and more attention. Guo, Tuan, et al. reported a dual-channel fiber-optic SPR sensor (Guo et al. 2016). Biomonitoring based on tilted Bragg grating (TFBG), the TFBG-SPR resonance mode detects the binding process of biological proteins, and the Bragg mode can simultaneously detect ambient temperature changes. Peng, Wei, et al. propose a dual-cone angle dual-channel fiber SPR sensor (Wei et al. 2005). The two channels can simultaneously detect the refractive index change and temperature change in the environment. A multi-channel sensor based on diffraction grating coupler SPR spectrum was studied by Czech scholar Pavel Adam (Adam et al. 2006). A dual-channel SPR sensor with top and bottom symmetrical bias core fibers (Liu et al. 2015), Dual-parameter SPR sensors based on D-type photonic crystal fibers (Ying et al. 2019; Zhao et al. 2019). However, most of these reported devices only have two sensing channels, which have certain limitations for high-throughput detection, and there are certain difficulties in the fabrication and processing of optical fiber devices.

Therefore, to enrich the research methods of multi-channel fiber SPR sensors, and increase the number of sensing channels of fiber SPR sensors. In this paper, a novel structure—multi-channel SPR sensor with heteronuclear fiber-coated silica capillary structure is proposed. Different from traditional optical fiber sensing devices, they use the static method of fixed optical fiber for detection. By combining the optical fiber with the quartz tube, the optical fiber moves in the quartz tube to increase the sensing area and realize the multi-channel design. The experimental channels designed in this paper are 6 to 9, and theoretically, dozens or hundreds of channels can be realized.

The heterocore fiber is made by splicing multimode fiber at both ends and a short section of single-mode fiber in the middle. Because of its simple processing and good SPR response in the visible band, it has been studied by many scholars as an optical fiber SPR sensor (Iga et al. 2005; Iga et al. 2004). Optical fiber flame taper technology (Kenny et al. 1991) is used for parameter optimization of quartz capillaries. The commercial quartz capillaries are heated and drawn into quartz capillaries with an inner diameter of 130 um and an outer diameter of 200 um that can be used in experiments.

The sensing probe consists of two parts: 1. Heterocore fiber 2. Silica capillary. Among them, the core diameter of the multimode fiber is 105 um and the core diameter of the single-mode fiber is 8 um and the length is 4 mm. A magnetron sputtering film-forming system (Shenyang Keyi Company) was used to coat the end of single-mode fiber with a gold film with a thickness of 300 nm to form a mirror, and the outer surface of the quartz capillary was coated with a gold film with a thickness of 50 nm for exciting SPR.

The sensor structure and sensing principle are shown in FIG. 24. First, visible light is transmitted in the multimode fiber and transmitted to the fusion splicing of the multimode fiber and the single-mode fiber. Due to the mismatch between the two cores, the cladding mode of the single-mode fiber is excited. This leaked light wave will produce SPR required optical evanescent waves, and then these modes pass through the refractive index matching liquid (refractive index 1.456) pre-filled in the quartz capillary, finally passes through the wall of the quartz capillary, and reaches the surface gold layer to excite the surface plasmon resonance effect.

The experimental device is shown in FIG. 25A. Two identical multimode fibers were fused with a core of 105 um through a fiber flame taper machine to make a fiber coupler, and the experimental device used was connected through the fiber coupler. One side of the coupler is connected to a visible light source (Shanghai Fuxiang Company, wavelength range 300-800 nm) and a visible light spectrometer (Shanghai Fuxiang Company, demodulation range 200-850 nm) to detect reflected light signals. The spectrometer is connected to the computer to display the SPR signal of the sensor in real-time, and the other end of the coupler is connected to the multi-channel optical fiber SPR sensor and the optical fiber position control system. To demonstrate the advantages of the multi-channel SPR sensor and its application on the multi-channel chip, a multi-channel chip, and an optical fiber position control system are designed and fabricated, through the optical fiber position control system, the optical fiber probe can be accurately inserted into the quartz capillary. In FIG. 26A and FIG. 26B, the micrographs of the optical fiber probe before and after being inserted into the quartz capillary are shown under a 20× microscope. The optical fiber motion control system realizes the position control of the optical fiber and the quartz capillary by using the optical displacement stage (Jiangxi Liansheng Co., Ltd.) and high-precision stepping motor (Shanghai Precision Co., Ltd., the motion accuracy can reach 1 um), and achieves the detection purpose of the designated channel. As shown in FIG. 26B, the multi-channel chip is made of polycarbonate (PC) material machined by (Taiwan Precision Instrument Co., Ltd.), the quartz tube can be fixed in the prefabricated groove of the multi-channel chip, and the fiber probe moves through the fiber control system can accurately move to the designated channel and detect the channel.

Here, a control experiment was designed to test the SPR sensing performance of the hetero-core fiber without silica capillary. The refractive index of the external environment (n=1.3334-1.3668) was measured by depositing a gold film with a thickness of 50 nm on the MSM fiber. As shown in FIG. 27A, from the experimental results, this fiber optic sensor structure can successfully excite the SPR effect and has a good response to the external refractive index, and the corresponding SPR resonance peak position appears in the visible band 600-700 nm. As shown in FIG. 27B. after smoothing and normalizing the experimental data, the sensitivity of the calculated sensor reaches 1746 nm/RIU, which is similar to the experimental results obtained by scholars, which also provides a basis for the proposal of the multi-channel sensor in this paper.

Next, a hetero-core fiber and a silica capillary is used to detect the external refractive index change. Here single-channel detection is used, which means that the fiber remains stationary in the silica capillary. The results of the experimental measurement of the refractive index of the external environment (n=1.3334-1.3797) are shown in FIG. 2A. The composite structure of the heterocore fiber and the silica capillary successfully excited the SPR phenomenon. There are a series of resonance peaks in the visible light band, and the weak change of the strong resonance peak is not large relative to the case without the quartz capillary as shown in FIG. 27A. After smoothing and normalizing the experimental data, the sensitivity of the calculated sensor reaches 1869 nm/RIU, and the linear fitting degree reaches 99.8%.

Figure 29A:
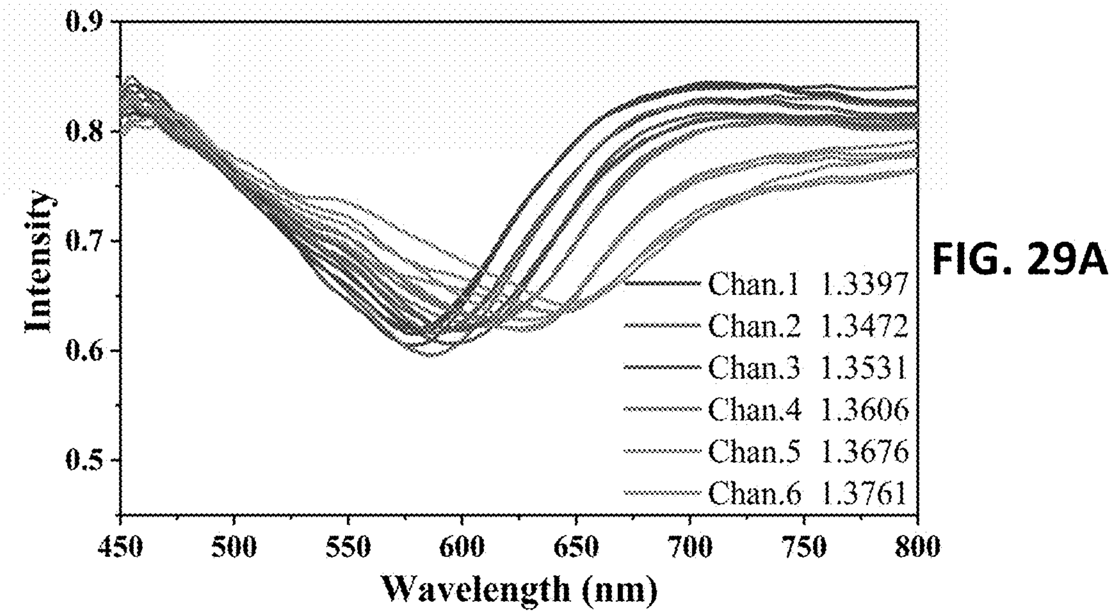
FIG. 29A and FIG. 29B show the response of reflection spectrum of the multi-channel fiber optic SPR sensor in the dynamic multi-channel state, with FIG. 29A showing the response of SPR Spectroscopy to different channels and different Solution Refractive Indexes, and FIG. 29B showing the relation between the resonance wavelength and the refractive index, where the fit goodness coefficient is $R^2$=99.7%.
Figure 29B:
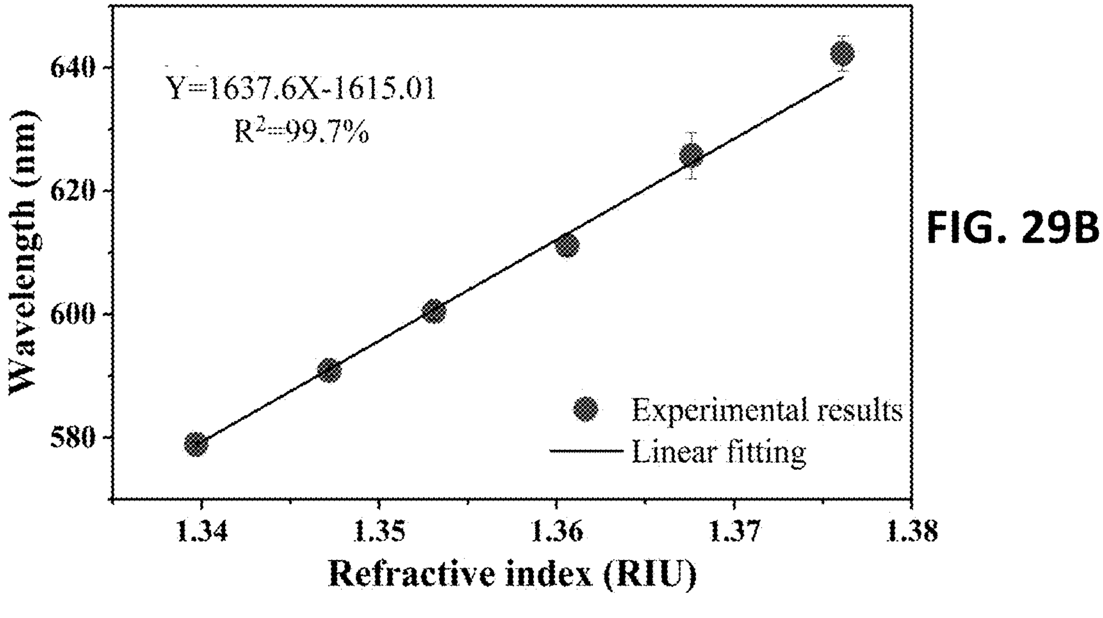

Finally, multichannel detection is used, meaning that the fibers remain in relative motion in the silica capillary, and repeat three cycles to measure the refractive index (n=1.3397-1.3761) in six different channels of the multi-channel chip. The results are shown in FIG. 29A the SPR resonance peaks of each channel are in good agreement with respect to wavelength, and the wavelength shift between different channels is clearly distinguished. After smoothing and normalizing the experimental data, the sensitivity of the calculated sensor reaches 1638 nm/RIU, and the linear fitting degree reaches 99.7%. However, the sensitivity of the sensor is lower than that of the static measurement state, mainly due to the quality of the gold film. Different thicknesses and roughness of the gold film will affect the resonance peak, reducing the sensitivity of the test spectrum and the depth of resonance. In addition, errors in the casing drawing process resulting in a non-smooth and uneven sensing surface may be another reason. A non-smooth or swollen surface can shift the SPR resonance wavelength, resulting in a decrease in the sensitivity and resonance depth of the test spectrum. In summary, the researchers developed a novel multi-channel SPR sensor based on heterocore fiber and silica capillary structure, which is the field of multi-parameter fiber SPR research. It effectively solves the problem that the development of multi-channel detection of optical fiber SPR sensing is difficult. Besides, the channel count of the multi-channel chip can be designed by changing the length of single-mode fiber. In theory, as long as the single-mode fiber of the hetero-core fiber is shortened within a controllable range. And the more the number of multi-channel chip processing, more channels of detection can be achieved.

This multi-channel fiber SPR sensor utilizes the principle that the hetero-core fiber can excite the cladding mode of the single-mode fiber to generate the SPR effect, and successfully realizes the multi-channel detection through the fiber-coated quartz tube, which greatly improves the detection efficiency. The researchers set up a control experiment to test the SPR response characteristics of the hetero-core fiber structure without adding silica capillary, which is consistent with the previous research results. Based on this, the researchers set the parameters of the quartz capillary as the inner diameter of 130 μm and the outer diameter of 200 μm, the length of the single-mode fiber was set to 4 mm, the core diameter of the multimode fiber was 105 μm, the refractive index of the silica tube was matched to 1.456, and the static single-channel fiber was set to 1.456. The detection can reach 1869 nm/RIU, and the dynamic multi-channel detection can reach 1637 nm/RIU. Compared with the previous control experiments, the detection of multiple channels is realized without greatly reducing the sensitivity.

In fact, other fiber sensors can be chosen to replace hetero-core fibers, such as fiber Bragg gratings, tilted Bragg gratings, photonic crystal fibers, etc. The introduction of quartz capillaries enables us to achieve the purpose of multi-channel detection. Although the test sensitivity is not as good as that of high-sensitivity fiber-optic refractive index sensors, this provides a new idea for the development of fiber-optic multi-channel SPR sensors.

REFERENCES

Albert J, Shao L Y, Caucheteur C. Tilted fiber Bragg grating sensors. *Laser Photonics Rev* 7, 83-108 (2013).

Guo T, Liu F, Guan B O, Albert J. Tilted fiber grating mechanical and biochemical sensors. *Opt Laser Technol* 78, 19-33 (2016).

Chen C K, Albert J. Strain-optic coefficients of individual cladding modes of single mode fibre: Theory and experiment. *Electron Lett* 42, 1027-1028 (2006).

Shao L Y, Xiong L, Chen C K, Laronche A, Albert J. Directional bend sensor based on re-grown tilted fiber bragg grating. *J Light Technol* 28, 2681-2687 (2010).

Kisala P, Harasim D, Mroczka J. Temperature-insensitive simultaneous rotation and displacement (bending) sensor based on tilted fiber Bragg grating. *Opt Express* 24, 29922-29929 (2016).

Wang R L, Li Z H, Chen X, Hu N, Xiao Y G et al. Mode Splitting in ITO-Nanocoated Tilted Fiber Bragg Gratings for Vector Twist Measurement. *J Light Technol* 39, 4151-4157 (2021).

Chan C F, Chen C K, Jafari A, Laronche A, Thomson D J et al. Optical fiber refractometer using narrowband cladding-mode resonance shifts. *Appl Opt* 46, 1142-1149 (2007).

Caucheteur C, Mégret P. Demodulation technique for weakly tilted fiber Bragg grating refractometer. *IEEE Photonics Technol Lett* 17, 2703-2705 (2005).

Zhou W J, Zhou Y, Albert J. A true fiber optic refractometer. *Laser Photonics Rev* 11, 1-10 (2017).

Zhang Z C, Guo T, Zhang X J, Xu J, Xie W P et al. Plasmonic fiber-optic vector magnetometer. *Appl Phys Lett* 108, 9-13 (2016).

Loyez M, Albert J, Caucheteur C, Wattiez R. Cytokeratins biosensing using tilted fiber gratings. *Biosensors* 8, 1-8 (2018).

Liu F, Guo T, Liu J G, Zhu X Y, Liu Y et al. High-sensitive and temperature-self-calibrated tilted fiber grating biological sensing probe. *Chinese Sci Bull* 58, 2611-2615 (2013).

Liu F, et al. Discrimination of Bulk and Surface Refractive Index Change in Plasmonic Sensors with Narrow Bandwidth Resonance Combs. *ACS Sensors* 6, 3013-3023 (2021).

Liu L H, Zhang X J, Zhu Q, Li K W, Lu Y et al. Ultrasensitive detection of endocrine disruptors via superfine plasmonic spectral combs. *Light Sci Appl* 10, 1-14 (2021).

Cai S S, Liu F, Wang R L, Xiao Y G, Li K W et al. Narrow bandwidth fiber-optic spectral combs for renewable hydrogen detection. *Sci China Inf Sci* 63, 1-9 (2020).

Caucheteur C, Guo T, Liu F, Guan B O, Albert J. Ultrasensitive plasmonic sensing in air using optical fibre spectral combs. *Nat Commun* 7, 1-8 (2016).

Huang J Q, Han X L, Liu F, Gervillié C, Blanquer L A et al. Monitoring battery electrolyte chemistry via in-operando tilted fiber Bragg grating sensors. *Energy Environ Sci*, (2021);

Lao J J, Sun P, Liu F, Zhang X J, Zhao C X et al. In situ plasmonic optical fiber detection of the state of charge of supercapacitors for renewable energy storage. *Light Sci Appl* 7, 1-11 (2018).

Wang G Y, et al. High-Speed and High-Resolution Microwave Photonic Interrogation of a Fiber-Optic Refractometer with Plasmonic Spectral Comb. *J Light Technol* 38, 2073-2080 (2020).

Bai X H, Claesson Å, Laronche A, Liu F, Hu M L et al. Sensing applications of fiber Bragg gratings in single mode fibers with as-drawn 25 μm diameter cladding. *Opt Laser Technol* 144, 1-7 (2021).

Sypabekova M, et al. Functionalized etched tilted fiber Bragg grating aptasensor for label-free protein detection. *Biosens Bioelectron* 146, 1-9 (2019).

Zhou W J, Mandia D J, Barry S T, Albert J. Absolute near-infrared refractometry with a calibrated tilted fiber Bragg grating. *Opt Lett* 40, 1713-1716 (2015).

Guo, T., et al. (2016). Tilted fiber grating mechanical and biochemical sensors. Optics & Laser Technology, 78, 19-33.

Yanase, Y., et al. (2010). Development of an optical fiber SPR sensor for living cell activation. Biosensors and Bioelectronics, 25(5), 1244-1247.

Wang, W., Mai, Z., Chen, Y., Wang, J., Li, L., Su, Q., . . . & Hong, X. (2017). A label-free fiber optic SPR biosensor for specific detection of C-reactive protein. Scientific reports, 7(1), 1-8.

Singh, P. (2016). SPR biosensors: historical perspectives and current challenges. Sensors and actuators B: Chemical, 229, 110-130.

Si, Y., et al. (2019). Electrochemical plasmonic fiber-optic sensors for ultra-sensitive heavy metal detection. Journal of Lightwave Technology, 37(14), 3495-3502.

Zhang, M., et al. (2020). A dual-channel optical fiber sensor based on surface plasmon resonance for heavy metal ions detection in contaminated water. Optics Communications, 462, 124750.

Tabassum, R., & Gupta, B. D. (2015). Fiber optic manganese ions sensor using SPR and nanocomposite of ZnO-polypyrrole. Sensors and Actuators B: Chemical, 220, 903-909.

Boruah, B. S., & Biswas, R. (2018). An optical fiber based surface plasmon resonance technique for sensing of lead ions: A toxic water pollutant. Optical Fiber Technology, 46, 152-156.

Prakashan, V. P., et al. (2020). Investigations on SPR induced Cu@ Ag core shell doped SiO2-TiO2-ZrO2 fiber optic sensor for mercury detection. Applied Surface Science, 507, 144957.

Ravindran, N., et al. (2021). Recent advances in Surface Plasmon Resonance (SPR) biosensors for food analysis: a review. Critical Reviews in Food Science and Nutrition, 1-23.

Homola, J. (2004). Surface plasmon resonance biosensors for food safety. In Optical Sensors (pp. 145-172). Springer, Berlin, Heidelberg.

Semwal, V., & Gupta, B. D. (2021). Highly selective SPR based fiber optic sensor for the detection of hydrogen peroxide. Sensors and Actuators B: Chemical, 329, 129062.

Tobišgka, P., Hugon, O., Trouillet, A., & Gagnaire, H. (2001). An integrated optic hydrogen sensor based on SPR on palladium. Sensors and Actuators B: Chemical, 74(1-3), 168-172.

Liu, H., et al. (2018). Simultaneous measurement of hydrogen and methane based on PCF-SPR structure with compound film-coated side-holes. Optical Fiber Technology, 45, 1-7.

Guo, T., et al. (2016). Highly sensitive detection of urinary protein variations using tilted fiber grating sensors with plasmonic nanocoatings. Biosensors and Bioelectronics, 78, 221-228.

Wei Peng, et al., "Investigation of dual-channel fiber-optic surface plasmon resonance sensing for biological applications," Opt. Lett. 30, 2988-2990 (2005)

Adam, P., Dostálek, J., & Homola, J. (2006). Multiple surface plasmon spectroscopy for study of biomolecular systems. Sensors and Actuators B: Chemical, 113(2), 774-781.

Liu, Z., et al. (2015). Distributed fiber surface plasmon resonance sensor based on the incident angle adjusting method. Optics letters, 40(19), 4452-4455.

Ying, Y., et al. (2019). Magnetic field and temperature sensor based on D-shaped photonic crystal fiber. Optik, 176, 309-314.

Zhao, L., et al. (2019). Theoretical analysis of all-solid D-type photonic crystal fiber based plasmonic sensor for refractive index and temperature sensing. Optical Fiber Technology, 50, 165-171.

Iga, M., Seki, A., & Watanabe, K. (2005). Gold thickness dependence of SPR-based hetero-core structured optical fiber sensor. Sensors and Actuators B: Chemical, 106(1), 363-368.

Iga, M., Seki, A., & Watanabe, K. (2004). Hetero-core structured fiber optic surface plasmon resonance sensor with silver film. Sensors and Actuators B: Chemical, 101(3), 368-372.

Kenny, R. P., Birks, T. A., & Oakley, K. P. (1991). Control of optical fiber taper shape. Electronics letters, 27(18), 1654-1656.

Liu, Guigen, and Kaiwei Li. "Micro/nano optical fibers for label-free detection of abrin with high sensitivity." Sensors and Actuators B: Chemical 215 (2015): 146-151.

Zhou, Wenchao, et al. "Ultrasensitive label-free optical microfiber coupler biosensor for detection of cardiac troponin I based on interference turning point effect." Biosensors and Bioelectronics 106 (2018): 99-104.

Liu, Lanhua, et al. "Ultrasensitive detection of endocrine disruptors via superfine plasmonic spectral combs." Light: Science & Applications 10.1 (2021): 1-14.

Hu, Wanjun, et al. "Highly sensitive detection of dopamine using a graphene functionalized plasmonic fiber-optic sensor with aptamer conformational amplification." Sensors and Actuators B: Chemical 264(2018): 440-447.

Guo, Tuan, et al. "In-situ detection of density alteration in non-physiological cells with polarimetric tilted fiber grating sensors." Biosensors and Bioelectronics 55 (2014): 452-458.

The invention claimed is:

1. A fiber optic sensing apparatus, comprising:

an outer sleeve, having a composition of a transparent polymer or a transparent glass;

an optical fiber sensor, arranged in an inner space of the outer sleeve; and a filling medium, arranged to fill a gap between the optical fiber sensor and the outer sleeve;

wherein:

a refractive index of the filling medium and a refractive index of the outer sleeve are configured to be matching;

the outer sleeve and the filling medium are configured such that the optical fiber sensor is capable of detecting a change of a refractive index or a change of surface plasmon waves over an outer surface of the outer sleeve; and the optical fiber sensor is configured to linearly move along an axial direction of the optical fiber sensor within the inner space of the outer sleeve so as to realize a detection of different sensing areas in a scanned manner.

2. The fiber optic sensing apparatus of claim 1, wherein the refractive index of the filling medium is within 5% deviation of the refractive index of the outer sleeve, wherein:

the refractive index of the outer sleeve is in a range of 1.33-3.00; and the refractive index of the filling medium is in a range of 1.33-1.80.

3. The fiber optic sensing apparatus of claim 2, wherein the outer sleeve has a composition of quartz glass, and the filling medium has a composition of an oil with a refractive index of approximately 1.46.

4. The fiber optic sensing apparatus of claim 1, wherein the outer surface of the outer sleeve directly contacts an outside medium.

5. The fiber optic sensing apparatus of claim 1, further comprising a coating layer assembly, wherein the coating layer assembly is arranged to coat the outer surface of the outer sleeve, and comprises at least one film layer.

6. The fiber optic sensing apparatus of claim 5, wherein the coating layer assembly comprises a reactive film layer, configured such that an outer surface of the reactive film layer is reactive to a target molecule in an outside medium.

7. The fiber optic sensing apparatus of claim 6, wherein the reactive film layer comprises a composition that is capable of reversibly reacting with the target molecule.

8. The fiber optic sensing apparatus of claim 5, wherein the coating layer assembly comprises a base film layer configured to be reactive to surface plasmon resonance (SPR).

9. The fiber optic sensing apparatus of claim 5, wherein the coating layer assembly is configured such that an outer surface thereof comprises a plurality of microstructures.

10. The fiber optic sensing apparatus of claim 1, wherein the optical fiber sensor is a transmission-mode optical fiber sensor.

11. The fiber optic sensing apparatus of claim 1, wherein the optical fiber sensor is a reflection-mode optical fiber sensor, wherein the optical fiber sensor comprises a mirror at one end surface thereof.

12. The fiber optic sensing apparatus of claim 1, wherein the optical fiber sensor comprises a single-mode optical fiber, wherein the single-mode optical fiber comprises a core and a cladding surrounding the core, wherein the core is provided with a grating structure selected from a group consisting of fiber Bragg gratings (FBGs), tilted fiber Bragg gratings (TFBGs), and long-period fiber gratings (LPFGs).

13. The fiber optic sensing apparatus of claim 12, wherein the core of the single-mode optical fiber is provided with a tilted fiber Bragg gratings (TFBGs) having an internal tilt angle in a range of approximately 5-25 degrees.

14. The fiber optic sensing apparatus of claim 12, wherein a refractive index of the cladding of single-mode optical fiber, a refractive index of the filling medium, and a refractive index of the outer sleeve are configured to be matching with one another.

15. The fiber optic sensing apparatus of claim 1, wherein the optical fiber sensor comprises:

a combination of at least one multimode optical fiber and at least one single-mode optical fiber; or a combination of at least one multimode optical fiber and at least one coreless optical fiber.

16. The fiber optic sensing apparatus of claim 15, wherein the optical fiber sensor comprises one multimode optical fiber and one single-mode optical fiber fused with one another, wherein the one multimode optical fiber and the one single-mode optical fiber are arranged in a light-transmission direction in the optical fiber sensor.

17. The fiber optic sensing apparatus of claim 15, wherein the optical fiber sensor comprises one multimode optical fiber and one coreless optical fiber fused with one another, wherein the one multimode optical fiber and the one coreless optical fiber are arranged in a light-transmission direction in the optical fiber sensor.

18. The fiber optic sensing apparatus of claim 15, further comprising a coating layer assembly, arranged to coat the outer surface of the outer sleeve, wherein the coating layer assembly comprises a base film layer configured to be reactive to surface plasmon resonance (SPR).

19. The fiber optic sensing apparatus of claim 1, further comprising at least one additional optical fiber sensor, wherein the optical fiber sensor and the at least one additional optical fiber sensor are all arranged in the inner space of the outer sleeve.

* * * * *